US012562852B2

(12) United States Patent
Liu

(10) Patent No.: US 12,562,852 B2
(45) Date of Patent: Feb. 24, 2026

(54) METHOD AND DEVICE IN NODES USED FOR WIRELESS COMMUNICATION

(71) Applicant: Zheng Liu, Shanghai (CN)

(72) Inventor: Zheng Liu, Shanghai (CN)

(73) Assignee: SHANGHAI CODUS TECHNOLOGY COMPANY LIMITED, Shanghai (CN)

( * ) Notice: Subject to any disclaimer, the term of this patent is extended or adjusted under 35 U.S.C. 154(b) by 1018 days.

(21) Appl. No.: 17/693,417

(22) Filed: Mar. 14, 2022

(65) Prior Publication Data

US 2022/0303066 A1     Sep. 22, 2022

(30) Foreign Application Priority Data

Mar. 17, 2021     (CN) .......................... 202110284311.5

(51) Int. Cl.
*H04L 1/1829*     (2023.01)
*H04L 5/00*     (2006.01)

(52) U.S. Cl.
CPC .......... *H04L 1/1861* (2013.01); *H04L 5/0055* (2013.01)

(58) Field of Classification Search
CPC ... H04L 1/1861; H04L 5/0055; H04L 1/1854; H04L 1/1896; H04L 1/1607; H04L 27/2601; H04W 4/06
See application file for complete search history.

(56) References Cited

U.S. PATENT DOCUMENTS

| | | | |
|---|---|---|---|
| 2011/0283157 A1 | 11/2011 | Yang et al. | |
| 2018/0167171 A1 | 6/2018 | Wu et al. | |
| 2022/0060290 A1* | 2/2022 | Wu ........................ | H04L 1/1861 |
| 2022/0086883 A1* | 3/2022 | Liu ........................ | H04W 72/54 |
| 2022/0225384 A1* | 7/2022 | Takeda ................... | H04W 72/04 |
| 2023/0063082 A1* | 3/2023 | Zhou ..................... | H04W 72/30 |

FOREIGN PATENT DOCUMENTS

| | | |
|---|---|---|
| CN | 106063177 A | 10/2016 |
| CN | 107210888 A | 9/2017 |
| CN | 110519025 A | 11/2019 |
| CN | 110635868 A | 12/2019 |

(Continued)

OTHER PUBLICATIONS

3GPP tsg_ran\WG1_RL1,TSGR1_8 2 Nokia Networks,R1-153827 "Number of HARQ Processes for MTC" Aug. 14, 2015.

(Continued)

*Primary Examiner* — Ashley Shivers

(57) ABSTRACT
The present disclosure provides method and device in nodes used for wireless communication. A node transmits a first HARQ feedback, the first HARQ feedback being used to indicate either an ACK or a NACK; receives a first PDCCH, the first PDCCH being used to determine scheduling information for a first PDSCH; and determines whether a target condition is fulfilled, and, when the target condition is fulfilled, transmits a second HARQ feedback, the second HARQ feedback being only used to indicate a NACK; the first PDSCH is used for a retransmission of a first bit block; the first HARQ feedback is used for the first bit block, the first HARQ feedback being used to determine the target condition. The present disclosure improves the HARQ retransmission resource utilization ratio.

20 Claims, 7 Drawing Sheets

(56)                         References Cited

FOREIGN PATENT DOCUMENTS

| CN | 110944403 | A  | 3/2020  |
| CN | 111800219 | A  | 10/2020 |
| CN | 112312351 | A  | 2/2021  |
| CN | 112436873 | A  | 3/2021  |
| WO | 2020022523 | A1 | 1/2020  |

OTHER PUBLICATIONS

徐志文;李小文;,                          TD-LTE 系统 HARQ 机制的设计与仿真 广东通信技术,05 May 15, 2012.

2018 IEEE International Symposium on Broadband Multimedia Systems and Broadcasting (BMSB) Thomas Fehrenbach 等 Reduced CBG HARQ Feedback for Efficient Multimedia Transmissions in 5G for Coexistence with URLLC Traffic Aug. 16, 2018.

First search report of the Chinese Patent Application No. CN202110284311.5, dated Apr. 25, 2024.

First Office Action of the Chinese Patent Application No. CN202110284311.5, dated Apr. 28, 2024.

Notification to Grant Patent Right for Invention of the Chinese Patent Application No. CN202110284311.5, dated May 24, 2024.

* cited by examiner

100

| transmitting first HARQ feedback | — 101 |

| receiving first PDCCH | — 102 |

| determining whether target condition is fulfilled, and, in cases when the target condition is fulfilled, transmitting second HARQ feedback | — 103 |

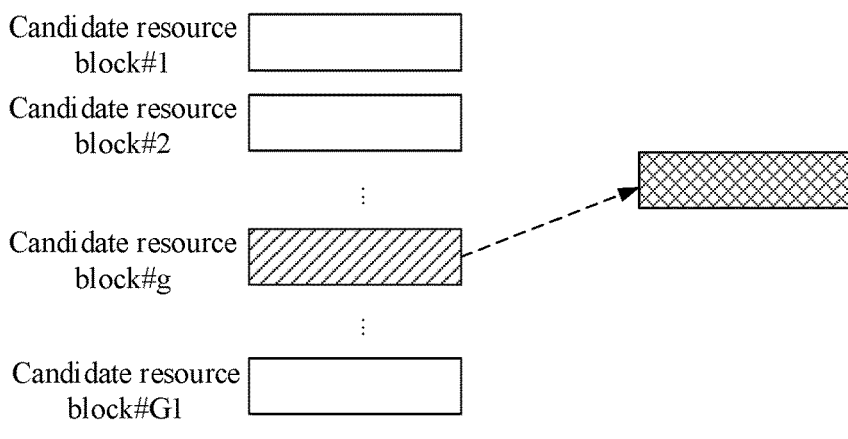
Candidate resource block#1
Candidate resource block#2
⋮
Candidate resource block#g
⋮
Candidate resource block#Gl
FIG. 8
| First HARQ feedback | NACK | ACK |
|---|---|---|
| First value | $v_1$ | $v_2$ |
| First HARQ feedback | NACK | |
| Second value | $v_1$ | |
FIG. 9
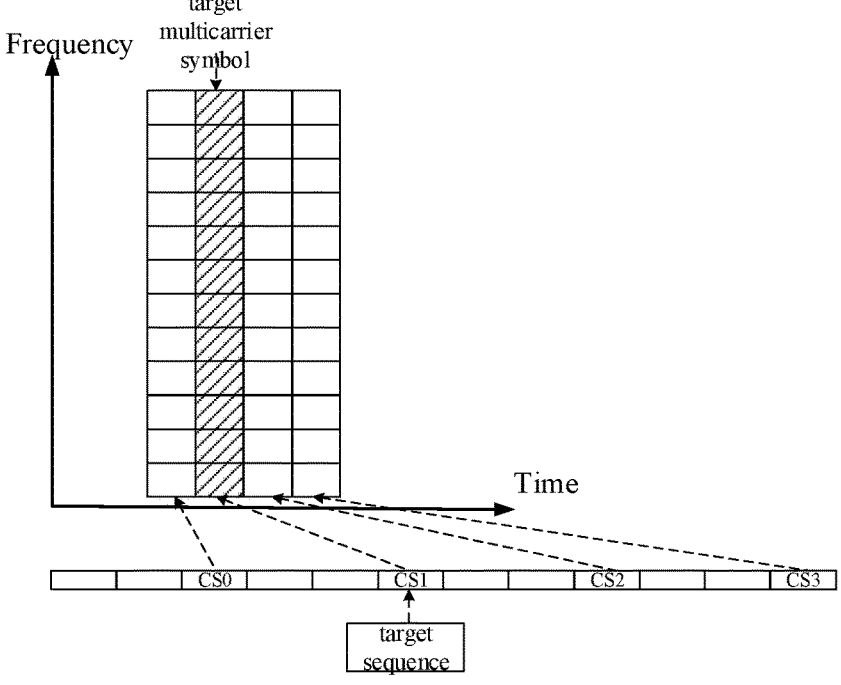
FIG. 10 first candidate
feedback mode second candidate
feedback mode

METHOD AND DEVICE IN NODES USED FOR WIRELESS COMMUNICATION

CROSS REFERENCE TO RELATED APPLICATIONS

This application claims the priority benefit of Chinese Patent Application No. 202110284311.5, filed on Mar. 17, 2021, the full disclosure of which is incorporated herein by reference.

BACKGROUND

Technical Field

The present disclosure relates to transmission methods and devices in wireless communication systems, and in particular to a scheme and device for groupcast, multicast or broadcast transmissions in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR. A decision was made at the 3GPP RAN #86 Plenary on starting a Study Item (SI) and Work Item (WI) of NR Rel-17.

In a wide range of application scenarios where NR technology is adopted, for instance, in firmware updating and video broadcasting, both Multicast and Broadcast traffics transmissions shall be supported. In NR Rel-17, to support multicast and broadcast services, a WI of NR-backed multicast and broadcast traffics was approved by the 3GPP RAN #86 to start work of standardization.

SUMMARY

In the WI of multicast and broadcast transmissions the HARQ feedback and retransmission are supported to enhance the robustness of multicast/broadcast transmission. To address the issue of HARQ retransmission in multicast/broadcast transmission, the present disclosure provides a solution. It should be noted that the statement in the present disclosure only takes multicast/broadcast transmission as a typical application scenario or example; The present disclosure also applies to other scenarios confronting similar difficulties, for instance, a scenario where various services co-exist, or a scenario where multiple parallel downlink transmissions for a same UE co-exist in a serving cell, where similar technical effects can be achieved. Additionally, the adoption of a unified solution for various scenarios, including but not limited to multicast/broadcast transmission scenarios, contributes to the reduction of hardcore complexity and costs. In the case of no conflict, the embodiments of a first node and the characteristics in the embodiments may be applied to a second node, and vice versa. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:

transmitting a first HARQ feedback, the first HARQ feedback being used to indicate either an ACK or a NACK;

receiving a first PDCCH, the first PDCCH being used to determine scheduling information for a first PDSCH; and determining whether a target condition is fulfilled, and, when the target condition is fulfilled, transmitting a second HARQ feedback, the second HARQ feedback being only used to indicate a NACK;

herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine the target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback.

In one embodiment, by determining a target condition according to the content of a first HARQ feedback and then determining a transmission of a second HARQ feedback, one can avoid resource wastes caused by retransmission due to extra decoding error during a groupcast retransmission, thus improving the system performance.

In one embodiment, a target condition is used to make a judgment about a transmission of a second HARQ feedback, therefore, when the feedback for a retransmission adopts NACK-only mode whether to send NACK-only feedback will be determined depending on a previous HARQ feedback, which will reduce the impact on decoding of this UE caused by retransmission triggered by failed receiving of other UE(s), thus avoiding unneeded NACK feedback and repetitions, increasing the utilization ratio of resources.

According to one aspect of the present disclosure, the above method is characterized in that the first HARQ feedback is used to determine whether the first PDSCH is to be received, the target condition comprising: the first PDSCH is received and decoding on the first bit block is failed; or comprising:

receiving the first PDSCH, the target condition comprising that: the first HARQ feedback indicates a NACK and the decoding on the first bit block is failed.

According to one aspect of the present disclosure, the above method is characterized in comprising:

receiving a first information block and a second PDCCH;

where the first information block is used to determine G1 candidate resource blocks, with a first resource block being one of the G1 candidate resource blocks, G1 being a positive integer greater than 1, the second PDCCH is used to determine the first resource block out of the G1 candidate resource blocks; the first HARQ feedback occupies a target resource block, the first resource block being used to determine the target resource block.

In one embodiment, a target resource block is determined according to a first resource block, so that for a groupcast-targeted HARQ feedback, even if multiple UEs share a same PDCCH, they can still distinguish HARQ resources among these UEs to ensure the reception of HARQ feedback, thus enhancing the transmission performance.

According to one aspect of the present disclosure, the above method is characterized in that the first HARQ feedback is used to determine a first value, the first value being equal to one of W1 candidate values, W1 being a positive integer greater than 1; the first value is used to determine a cyclic shift value of sequence(s) comprised in a first sequence set, the first sequence set comprises a positive integer number of sequence(s), and any sequence comprised in the first sequence set is generated by a first basic sequence through cyclic shift; a second value is used for the second HARQ feedback, and the second value is used to determine a cyclic shift value of sequence(s) comprised in a second sequence set, the second sequence set comprises a positive integer number of sequence(s), and any sequence comprised in the second sequence set is generated by the first basic sequence through cyclic shift; any of the W1 candidate values is a non-negative integer, and the second value is equal to one of the W1 candidate values.

According to one aspect of the present disclosure, the above method is characterized in that a target PUCCH is used for carrying the second HARQ feedback, the target PUCCH occupying X1 multicarrier symbols in time domain, where X1 is a positive integer greater than 1; a target multicarrier symbol is one of the X1 multicarrier symbols, a target RE set comprises multiple REs occupied by the target PUCCH, any RE comprised in the target RE set occupying the target multicarrier symbol in time domain; a target sequence is used for generating a complex-valued symbol mapped onto the target RE set, a time-domain position of the target multicarrier symbol is used to determine the target sequence.

In one embodiment, for NACK-only HARQ feedback, make a cyclic shift of a generating sequence for a PUCCH carrying NACK-only change according to OFDM symbols within a range of cyclic shifts between which a difference of cyclic shift value is maximum, the diversity gain of NACK feedback information transmission will then be enhanced and so does the link performance.

According to one aspect of the present disclosure, the above method is characterized in that X2 modulation symbols are used for generating the target PUCCH, X2 being a positive integer greater than 1; any two modulation symbols among the X2 modulation symbols employ a same modulation mode, and there are two modulation symbols among the X2 modulation symbols having different phases; a target RE is an RE occupied by the target PUCCH, a target modulation symbol is one of the X2 modulation symbols, and the target modulation symbol is used for generating a complex-valued symbol mapped onto the target RE; the target RE occupies the target multicarrier symbol in time domain, a time-domain position of the target multicarrier symbol is used to determine the target modulation symbol.

In one embodiment, by determining a target modulation symbol based on a position of a target multicarrier symbol, modulation symbols with varying phases will be supported to be adopted on different OFDM symbols to carry NACK-only feedback information, which not only increases the diversity gains of modulation phases but also the robustness of NACK feedback information transmission.

According to one aspect of the present disclosure, the above method is characterized in that the first PDCCH is used to determine that the first PDSCH carries a retransmission of the first bit block; the first PDCCH is used to indicate a feedback mode adopted by the second HARQ feedback, which is either a first candidate feedback mode or a second candidate feedback mode; the HARQ feedback which adopts the first candidate feedback mode comprises one of an ACK or a NACK, while the HARQ feedback which adopts the second candidate feedback mode comprises only a NACK.

In one embodiment, the mode of indicating a HARQ feedback dynamically by scheduling a retransmitted PDCCH can improve the flexibility of HARQ feedback and strikes a balance between spectrum efficiency and signaling overhead.

The present disclosure provides a method in a second node for wireless communications, comprising:

receiving a first HARQ feedback, the first HARQ feedback being used to indicate either an ACK or a NACK;

transmitting a first PDCCH, the first PDCCH being used to determine scheduling information for a first PDSCH; and monitoring a second HARQ feedback, the second HARQ feedback being only used to indicate a NACK;

herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine a target condition, when the target condition is fulfilled the second HARQ feedback is transmitted; the second HARQ feedback is used for the first bit block, and the second HARQ feedback is no earlier than the first PDSCH, the first PDCCH is used to indicate at least one of a time-domain resource occupied by the second HARQ feedback, a frequency-domain resource occupied by the second HARQ feedback or a code-domain resource occupied by the second HARQ feedback.

According to one aspect of the present disclosure, the above method is characterized in comprising:

transmitting the first PDSCH;

herein, the first HARQ feedback is used to determine whether the first PDSCH is to be received, the target condition comprising that: the first PDSCH is received and decoding on the first bit block is failed; or the transmitter for the first HARQ feedback receives the first PDSCH, the target condition comprising that: the first HARQ feedback indicates a NACK and the decoding on the first bit block is failed.

According to one aspect of the present disclosure, the above method is characterized in comprising:

transmitting a first information block and a second PDCCH;

where the first information block is used to determine G1 candidate resource blocks, with a first resource block being one of the G1 candidate resource blocks, G1 being a positive integer greater than 1, the second PDCCH is used to indicate the first resource block out of the G1 candidate resource blocks; the first HARQ feedback occupies a target resource block, the first resource block being used to determine the target resource block.

According to one aspect of the present disclosure, the above method is characterized in that the first HARQ feedback is used to determine a first value, the first value being equal to one of W1 candidate values, W1 being a positive integer greater than 1; the first value is used to determine a cyclic shift value of sequence(s) comprised in a first sequence set, the first sequence set comprises a positive integer number of sequence(s), and any sequence comprised in the first sequence set is generated by a first basic sequence through cyclic shift; a second value is used for the second HARQ feedback, and the second value is used to determine a cyclic shift value of sequence(s) comprised in a second sequence set, the second sequence set comprises a positive integer number of sequence(s), and any sequence comprised in the second sequence set is generated by the first basic sequence through cyclic shift; any of the W1 candidate values is a non-negative integer, and the second value is equal to one of the W1 candidate values.

According to one aspect of the present disclosure, the above method is characterized in that a target PUCCH is used for carrying the second HARQ feedback, the target PUCCH occupying X1 multicarrier symbols in time domain, where X1 is a positive integer greater than 1; a target multicarrier symbol is one of the X1 multicarrier symbols, a target RE set comprises multiple REs occupied by the target PUCCH, any RE comprised in the target RE set occupying the target multicarrier symbol in time domain; a target sequence is used for generating a complex-valued symbol mapped onto the target RE set, a time-domain position of the target multicarrier symbol is used to determine the target sequence.

According to one aspect of the present disclosure, the above method is characterized in that X2 modulation symbols are used for generating the target PUCCH, X2 being a positive integer greater than 1; any two modulation symbols among the X2 modulation symbols employ a same modulation mode, and there are two modulation symbols among the X2 modulation symbols having different phases; a target RE is an RE occupied by the target PUCCH, a target modulation symbol is one of the X2 modulation symbols, and the target modulation symbol is used for generating a complex-valued symbol mapped onto the target RE; the target RE occupies the target multicarrier symbol in time domain, a time-domain position of the target multicarrier symbol is used to determine the target modulation symbol.

According to one aspect of the present disclosure, the above method is characterized in that the first PDCCH is used to indicate that the first PDSCH carries a retransmission of the first bit block; the first PDCCH is used to indicate a feedback mode adopted by the second HARQ feedback, which is either a first candidate feedback mode or a second candidate feedback mode; the HARQ feedback which adopts the first candidate feedback mode comprises one of an ACK or a NACK, while the HARQ feedback which adopts the second candidate feedback mode comprises only a NACK.

The present disclosure provides a first node for wireless communications, comprising:

a first transmitter, transmitting a first HARQ feedback, the first HARQ feedback being used to indicate either an ACK or a NACK;

a first receiver, receiving a first PDCCH, the first PDCCH being used to determine scheduling information for a first PDSCH; and a second transmitter, determining whether a target condition is fulfilled, and, when the target condition is fulfilled, transmitting a second HARQ feedback, the second HARQ feedback being only used to indicate a NACK;

herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine the target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback.

The present disclosure provides a second node for wireless communications, comprising:

a second receiver, receiving a first HARQ feedback, the first HARQ feedback being used to indicate either an ACK or a NACK;

a third transmitter, transmitting a first PDCCH, the first PDCCH being used to determine scheduling information for a first PDSCH; and a third receiver, monitoring a second HARQ feedback, the second HARQ feedback being only used to indicate a NACK;

herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine a target condition, when the target condition is fulfilled the second HARQ feedback is transmitted; the second HARQ feedback is used for the first bit block, and the second HARQ feedback is no earlier than the first PDSCH, the first PDCCH is used to indicate at least one of a time-domain resource occupied by the second HARQ feedback, a frequency-domain resource occupied by the second HARQ feedback or a code-domain resource occupied by the second HARQ feedback.

In one embodiment, the method in the present disclosure has the following advantages:

adopting the method in the present disclosure can prevent wastes of resources caused by retransmission resulting from extra decoding error in groupcast retransmissions, thus improving the system performance;

when the method in the present disclosure adopts NACK-only mode targeting the feedback for a retransmission whether to send NACK-only feedback will be determined depending on a previous HARQ feedback, which will reduce the impact on decoding of this UE caused by retransmission triggered by failed receiving of other UE(s), thus avoiding unneeded NACK feedback and repetitions, increasing the utilization ratio of resources;

if adopting the method in the present disclosure, for a groupcast-targeted HARQ feedback, even if multiple UEs share a same PDCCH, they can still distinguish HARQ resources among these UEs to ensure the reception of HARQ feedback, thus enhancing the transmission performance;

for NACK-only HARQ feedback, the method in the present disclosure makes a cyclic shift of a generating sequence for a PUCCH carrying NACK-only change according to OFDM symbols within a range of cyclic shifts between which a difference of cyclic shift value is maximum, the diversity gain of NACK feedback information transmission will then be enhanced and so does the link performance;

as proposed in the method in the present disclosure, modulation symbols with varying phases will be supported to be adopted on different OFDM symbols to carry NACK-only feedback information, which not only increases the diversity gains of modulation phases but also the robustness of NACK feedback information transmission;

through the mode of indicating a HARQ feedback dynamically by scheduling a retransmitted PDCCH, the method in the present disclosure can improve the flexibility of HARQ feedback and strike a balance between spectrum efficiency and signaling overhead.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram illustrating a relation between a first resource block and a target resource block according to one embodiment of the present disclosure.

FIG. 9 illustrates a schematic diagram of a relation between a first value and a second value according to one embodiment of the present disclosure.

FIG. 10 illustrates a schematic diagram of a relation between a target multicarrier symbol and a target sequence according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figures 1, 2:
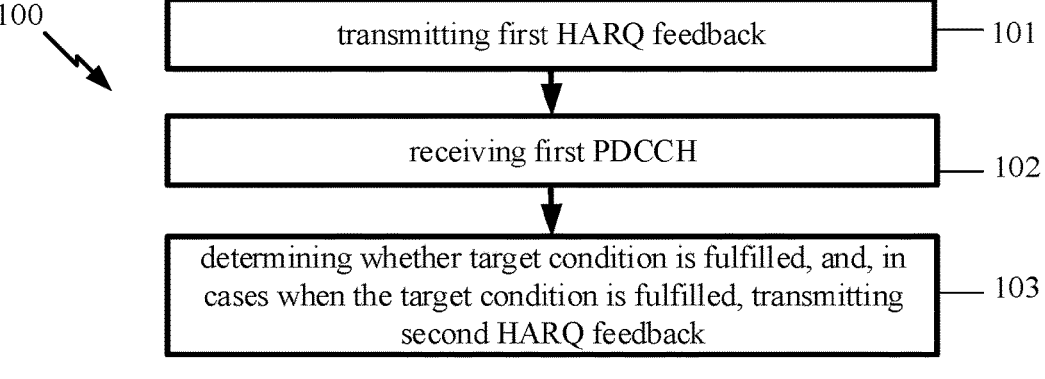
FIG. 1 illustrates a flowchart of a first HARQ feedback, a first PDCCH and a second HARQ feedback according to one embodiment of the present disclosure.
FIG. 2 illustrates a schematic diagram of a network architecture according to one embodiment of the present disclosure.

Embodiment 1 illustrates a flowchart 100 of a first HARQ feedback, a first PDCCH and a second HARQ feedback according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, a first node in the present disclosure transmits a first HARQ feedback in step 101, the first HARQ feedback being used to indicate either an ACK or a NACK; the first node in the present disclosure receives a first PDCCH, the first PDCCH being used to determine scheduling information for a first PDSCH; and the first node in the present disclosure determines whether a target condition is fulfilled, and, when the target condition is fulfilled, transmits a second HARQ feedback, the second HARQ feedback being only used to indicate a NACK; herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine the target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback.

In one embodiment, the first HARQ feedback comprises Hybrid Automatic Repeat Request-Acknowledgement (HARQ-ACK) information.

In one embodiment, the first HARQ feedback comprises a positive integer number of physical layer HARQ-ACK bit(s).

In one embodiment, the first HARQ feedback comprises a positive integer number of bit(s).

In one embodiment, the first HARQ feedback comprises only one bit.

In one embodiment, the first HARQ feedback is a HARQ-ACK Codebook.

In one embodiment, the first HARQ feedback comprises partial bits in a HARQC-ACK Codebook.

In one embodiment, the first HARQ feedback comprises all or partial bits in a Uplink Control Information (UCI) Payload.

In one embodiment, the first HARQ feedback is transmitted on a Physical Uplink Control Channel (PUCCH).

In one embodiment, the first HARQ feedback is transmitted on a Physical Uplink Shared Channel (PUSCH).

In one embodiment, when the first HARQ feedback is transmitted on a Physical Uplink Control Channel (PUCCH), the PUCCH carrying the first HARQ feedback adopts a same PUCCH Format as a PUCCH carrying the second HARQ feedback.

In one embodiment, when the first HARQ feedback is transmitted on a Physical Uplink Control Channel (PUCCH), the PUCCH carrying the first HARQ feedback adopts a PUCCH Format different from that adopted by a PUCCH carrying the second HARQ feedback.

In one embodiment, the first HARQ feedback may comprise either an ACK bit or a NACK bit.

In one embodiment, the statement that "the first HARQ feedback being used to indicate either an ACK or a NACK" in the claims includes the following meaning: The first HARQ feedback is used by the first node in the present disclosure for indicating either an ACK or a NACK.

In one embodiment, the statement that "the first HARQ feedback being used to indicate either an ACK or a NACK"

in the claims includes the following meaning: The first HARQ feedback is used for indicating an ACK (i.e., positive acknowledgement).

In one embodiment, the statement that "the first HARQ feedback being used to indicate either an ACK or a NACK" in the claims includes the following meaning: The first HARQ feedback is used for indicating a NACK (i.e., negative acknowledgement).

In one embodiment, the statement that "the first HARQ feedback being used to indicate either an ACK or a NACK" in the claims includes the following meaning: The first HARQ feedback is used for explicitly indicating one of an ACK or a NACK.

In one embodiment, the statement that "the first HARQ feedback being used to indicate either an ACK or a NACK" in the claims includes the following meaning: The first HARQ feedback is used for implicitly indicating one of an ACK or a NACK.

In one embodiment, the statement that "the first HARQ feedback being used to indicate either an ACK or a NACK" in the claims includes the following meaning: The first HARQ feedback comprises HARQ-ACK bit(s).

In one embodiment, the statement that "the first HARQ feedback being used to indicate either an ACK or a NACK" in the claims includes the following meaning: Bit(s) comprised in the first HARQ feedback is(are) used for indicating one of an ACK or a NACK.

In one embodiment, the first PDCCH comprises a baseband signal or a radio frequency signal in a Physical Downlink Control Channel (PDCCH).

In one embodiment, the first PDCCH carries Downlink Control Information (DCI).

In one embodiment, a DCI-format DCI Payload is used for generating the first PDCCH.

In one embodiment, the first PDCCH occupies a PDCCH Candidate.

In one embodiment, the first PDCCH occupies a positive integer number of Control Channel Element(s) (CCE(s)).

In one embodiment, the number of CCE(s) occupied by the first PDCCH is equal to one of 1, 2, 4, 8 or 16.

In one embodiment, the first PDCCH is a PDCCH scheduling a Physical Downlink Shared Channel (PDSCH), or the first PDCCH is a PDCCH used for a Semi-Persistent Scheduling (SPS) PDSCH Release.

In one embodiment, the first PDCCH is a PDCCH scheduling a Unicast PDSCH.

In one embodiment, the first PDCCH is a PDCCH used for multicast or broadcast.

In one embodiment, the first PDCCH is a PDCCH scheduling a multicast or broadcast PDSCH.

In one embodiment, the first PDCCH is a PDCCH scheduling a PDSCH, an RNTI other than a Cell-Radio Network Temporary Identifier (C-RNTI) is used to initialize a scrambling generator for a PDSCH scheduled by the first PDCCH.

In one embodiment, CRC of the first PDCCH is scrambled by a C-RNTI.

In one embodiment, CRC of the first PDCCH is scrambled by an RNTI other than a C-RNTI.

In one embodiment, the first node in the present disclosure receives the first PDSCH (or decodes a Transport Block (i.e., TB) carried by the first PDCCH).

In one embodiment, the first node in the present disclosure cancels reception of the first PDSCH (or drops decoding a Transport Block (i.e., TB) carried by the first PDCCH).

In one embodiment, the first PDSCH comprises a baseband signal or a radio frequency signal in a Physical Downlink Shared Channel (PDSCH).

In one embodiment, the first PDSCH is a Semi-Persistent Scheduling (SPS) PDSCH.

In one embodiment, the first PDSCH is a dynamically scheduling PDSCH.

In one embodiment, the first PDSCH is unicast.

In one embodiment, the first PDSCH is multicast or broadcast.

In one embodiment, a C-RNTI is used to initialize a Generator for scrambling for the first PDSCH.

In one embodiment, an RNTI other than the C-RNTI is used to initialize a Generator for scrambling for the first PDSCH.

In one embodiment, an RNTI assigned for multicast or broadcast is used to initialize a Generator for scrambling for the first PDSCH.

In one embodiment, scheduling information for the first PDSCH comprises at least one of a time-domain resource occupied by the first PDSCH, a frequency-domain resource occupied by the first PDSCH, a Redundancy Version (RV) adopted by the first PDSCH, or a HARQ process that the first PDSCH belongs, or a Modulation and Coding Scheme (MCS) adopted by the first PDSCH.

In one embodiment, the statement in the claims of "the first PDCCH being used to determine scheduling information for a first PDSCH" includes a meaning that: the first PDCCH is used by the first node in the present disclosure to determine scheduling information for the first PDSCH.

In one embodiment, the statement in the claims of "the first PDCCH being used to determine scheduling information for a first PDSCH" includes a meaning that: the first PDCCH is used for explicitly or implicitly indicating scheduling information for the first PDSCH.

In one embodiment, the statement in the claims of "the first PDCCH being used to determine scheduling information for a first PDSCH" includes a meaning that: the first PDCCH carries DCI scheduling the first PDSCH.

In one embodiment, the statement in the claims of "the first PDCCH being used to determine scheduling information for a first PDSCH" includes a meaning that: the first PDCCH carries DCI for activating an SPS Process to which the first PDSCH belongs.

In one embodiment, when the target condition is unfulfilled, the first node in the present disclosure drops transmitting the second HARQ feedback.

In one embodiment, when the target condition is unfulfilled, the first node in the present disclosure does not transmit the second HARQ feedback.

In one embodiment, when the target condition is unfulfilled, the first node in the present disclosure is not required to transmit the second HARQ feedback.

In one embodiment, when the target condition is unfulfilled, whether the first node in the present disclosure transmits the second HARQ feedback is undefined in protocols.

In one embodiment, when the target condition is unfulfilled, whether the first bit block is correctly decoded or whether the first PDSCH is correctly decoded is used to determine whether the first node in the present disclosure transmits the second HARQ feedback.

In one embodiment, when the target condition is unfulfilled, whether the first node in the present disclosure transmits the second HARQ feedback depends upon implementation.

In one embodiment, the target condition comprises: the first HARQ feedback indicates a NACK and the first bit block is incorrectly decoded after reception of the first PDSCH.

In one embodiment, the target condition comprises: the first HARQ feedback indicates a NACK and the first bit block is incorrectly decoded.

In one embodiment, the target condition comprises: the first HARQ feedback indicates a NACK and the first PDSCH is incorrectly decoded.

In one embodiment, the target condition comprises: the first node in the present disclosure receives the first PDSCH and the first PDSCH is incorrectly decoded.

In one embodiment, the target condition comprises: the first node in the present disclosure receives the first PDSCH and the first bit block is incorrectly decoded.

In one embodiment, the target condition comprises: the first node in the present disclosure receives the first PDSCH and the first bit block is incorrectly decoded after reception of the first PDSCH.

In one embodiment, the target condition comprises: the first HARQ feedback indicates a NACK.

In one embodiment, the target condition comprises: the first HARQ feedback indicates an ACK and the first PDSCH is incorrectly decoded.

In one embodiment, the target condition comprises: the first HARQ feedback indicates an ACK and the first bit block is incorrectly decoded.

In one embodiment, the target condition comprises: the first HARQ feedback indicates an ACK and the first bit block is incorrectly decoded after reception of the first PDSCH.

In one embodiment, the second HARQ feedback comprises HARQ-ACK information.

In one embodiment, the second HARQ feedback comprises a positive integer number of physical layer HARQ-ACK bit(s).

In one embodiment, the second HARQ feedback comprises only one bit.

In one embodiment, the second HARQ feedback comprises all or partial bits in a Uplink Control Information (UCI) Payload.

In one embodiment, the second HARQ feedback is transmitted on a Physical Uplink Control Channel (PUCCH).

In one embodiment, the statement that "the second HARQ feedback being only used to indicate a NACK" in the claims includes the following meaning: the second HARQ feedback is used by the first node in the present disclosure for only indicating a NACK.

In one embodiment, the statement that "the second HARQ feedback being only used to indicate a NACK" in the claims includes the following meaning: transmission of the second HARQ feedback is used for indicating a NACK.

In one embodiment, the statement that "the second HARQ feedback being only used to indicate a NACK" in the claims includes the following meaning: the second HARQ feedback is a NACK-only HARQ feedback.

In one embodiment, the statement that "the second HARQ feedback being only used to indicate a NACK" in the claims includes the following meaning: when the second HARQ feedback is transmitted, the first node in the present disclosure indicates a NACK; otherwise, the first node in the present disclosure indicates an ACK.

In one embodiment, the statement that "the second HARQ feedback being only used to indicate a NACK" in the claims includes the following meaning: a signal carrying the second HARQ feedback being detected denotes a NACK.

In one embodiment, the statement that "the second HARQ feedback being only used to indicate a NACK" in the claims includes the following meaning: energy of a signal carrying the second HARQ feedback exceeding a default threshold denotes a NACK.

In one embodiment, the statement that "the second HARQ feedback being only used to indicate a NACK" in the claims includes the following meaning: a receiver for the second HARQ feedback determines whether a HARQ feedback is a NACK or an ACK depending on whether the second HARQ feedback is being transmitted.

In one embodiment, the statement that "the second HARQ feedback being only used to indicate a NACK" in the claims includes the following meaning: transmission of the second HARQ feedback does not denote an ACK.

In one embodiment, the first bit block comprises all or partial bits in a Transport Block (TB).

In one embodiment, the first bit block is a Transport Block (TB).

In one embodiment, the first bit block is a Code Block Group (CBG).

In one embodiment, the first bit block comprises all or partial bits in a Code Block Group (CBG).

In one embodiment, the first bit block comprises a positive integer number of Code Block(s) (CB(s)).

In one embodiment, bits in the first bit block are arranged in sequence.

In one embodiment, the first bit block is all or partial bits in a Medium Access Control (MAC) Protocol Data Unit (PDU).

In one embodiment, the statement that "the first PDSCH is used for a retransmission of a first bit block" includes the following meaning: the first PDSCH is used by the second node in the present disclosure for a retransmission of the first bit block.

In one embodiment, the statement that "the first PDSCH is used for a retransmission of a first bit block" includes the following meaning: the first PDSCH carries a retransmission of the first bit block.

In one embodiment, the statement that "the first PDSCH is used for a retransmission of a first bit block" includes the following meaning: the first bit block is used for generating the first PDSCH, there is a signal or a channel earlier than the first PDSCH that carries the first bit block, too.

In one embodiment, the statement that "the first PDSCH is used for a retransmission of a first bit block" includes the following meaning: the first bit block is used for generating the first PDSCH, the first bit block having been transmitted before the first PDSCH.

In one embodiment, the statement that "the first PDSCH is used for a retransmission of a first bit block" includes the following meaning: the first PDSCH is used for a first retransmission of the first bit block.

In one embodiment, the statement that "the first PDSCH is used for a retransmission of a first bit block" includes the following meaning: the first PDSCH is used for a Q1-th retransmission of the first bit block, Q1 being a positive integer no less than a retransmission threshold, the retransmission threshold being default, or configurable.

In one embodiment, the statement that "the first PDSCH is used for a retransmission of a first bit block" includes the following meaning: the first PDSCH is used for a transmission of the first bit block after an Initial transmission of the first bit block.

In one embodiment, the statement that "the first PDSCH is used for a retransmission of a first bit block" includes the following meaning: the first bit block is retransmitted through the first PDSCH.

In one embodiment, the statement that "the first HARQ feedback is used for the first bit block" in the claims includes the following meaning: the first HARQ feedback is used by the first node or/and the second node in the present disclosure for the first bit block.

In one embodiment, the statement that "the first HARQ feedback is used for the first bit block" in the claims includes the following meaning: the first HARQ feedback comprises HARQ-ACK information for the first bit block.

In one embodiment, the statement that "the first HARQ feedback is used for the first bit block" in the claims includes the following meaning: the first HARQ feedback is used for indicating whether the first bit block is correctly decoded or whether the first bit block is correctly received.

In one embodiment, the statement that "the first HARQ feedback is used for the first bit block" in the claims includes the following meaning: the first HARQ feedback is used for indicating whether the first bit block is correctly decoded when transmitting the first HARQ feedback.

In one embodiment, the statement that "the first HARQ feedback is used for the first bit block" in the claims includes the following meaning: the first HARQ feedback is used for indicating whether the first bit block is correctly decoded before transmitting the first HARQ feedback.

In one embodiment, the statement that "the first HARQ feedback is used for the first bit block" in the claims includes the following meaning: the first HARQ feedback is used for indicating whether a signal carrying the first bit block before the first HARQ feedback is correctly decoded or whether it is correctly received.

In one embodiment, the statement that "the first HARQ feedback is used for the first bit block" in the claims includes the following meaning: the first HARQ feedback corresponds to the first bit block In one embodiment, the statement that "the first HARQ feedback is earlier than the first PDSCH" in the claims includes the following meaning: a signal or a channel carrying the first HARQ feedback is earlier than the first PDSCH.

In one embodiment, the statement that "the first HARQ feedback is earlier than the first PDSCH" in the claims includes the following meaning: a start time for a signal or a channel carrying the first HARQ feedback is earlier than that of the first PDSCH.

In one embodiment, the statement that "the first HARQ feedback is earlier than the first PDSCH" in the claims includes the following meaning: an end time for a signal or a channel carrying the first HARQ feedback is earlier than a start time of the first PDSCH.

In one embodiment, the statement that "the first HARQ feedback is earlier than the first PDSCH" in the claims includes the following meaning: an end time for a signal or a channel carrying the first HARQ feedback is earlier than that of the first PDSCH.

In one embodiment, the statement that "the first HARQ feedback is earlier than the first PDSCH" in the claims includes the following meaning: a last time-domain symbol occupied by a signal or a channel carrying the first HARQ feedback is earlier than an earliest time-domain symbol occupied by the first PDSCH.

In one embodiment, the statement of "the first HARQ feedback being used to determine the target condition" in the claims includes the following meaning: the first HARQ feedback is used by the first node in the present disclosure for determining the target condition.

In one embodiment, the statement of "the first HARQ feedback being used to determine the target condition" in the claims means: whether the first bit block is correctly decoded before the first HARQ feedback is used to determine the target condition.

In one embodiment, the statement of "the first HARQ feedback being used to determine the target condition" in the claims is implemented by the claim 2 in the present disclosure.

In one embodiment, the statement of "the first HARQ feedback being used to determine the target condition" in the claims means: the target condition comprises that the first HARQ feedback indicates a NACK.

In one embodiment, the statement of "the first HARQ feedback being used to determine the target condition" in the claims means: the target condition comprises that the first bit block is not yet delivered to a higher layer.

In one embodiment, the statement of "the first HARQ feedback being used to determine the target condition" in the claims means: the target condition comprises that the first bit block is not yet delivered to a disassembly and demultiplexing entity.

In one embodiment, the statement of "the first HARQ feedback being used to determine the target condition" in the claims means: the target condition comprises that the first bit block is not correctly decoded.

In one embodiment, the statement of "the first HARQ feedback being used to determine the target condition" in the claims means: the target condition comprises that the first bit block is not correctly decoded before reception of the first PDSCH.

In one embodiment, the statement of "the first HARQ feedback being used to determine the target condition" in the claims means: the first HARQ feedback is used to determine whether the target condition comprises receiving the first PDSCH.

In one embodiment, the statement of "the first HARQ feedback being used to determine the target condition" in the claims means: the target condition contains the first HARQ feedback.

In one embodiment, the statement of "the first HARQ feedback being used to determine the target condition" in the claims means: whether the target condition is fulfilled is influenced by the first HARQ feedback.

In one embodiment, the statement that "the second HARQ feedback is used for the first bit block" in the claims includes the following meaning: the second HARQ feedback is used by the first node or/and the second node in the present disclosure for the first bit block.

In one embodiment, the statement that "the second HARQ feedback is used for the first bit block" in the claims includes the following meaning: the second HARQ feedback comprises HARQ-ACK information for the first bit block.

In one embodiment, the statement that "the second HARQ feedback is used for the first bit block" in the claims includes the following meaning: the second HARQ feedback comprises NACK-only information for the first bit block.

In one embodiment, the statement that "the second HARQ feedback is used for the first bit block" in the claims includes the following meaning: the second HARQ feedback is used for indicating that the first bit block is falsely decoded or falsely received.

In one embodiment, the statement that "the second HARQ feedback is used for the first bit block" in the claims includes the following meaning: the second HARQ feedback is used for indicating that the first bit block is falsely decoded or falsely received when transmitting the second HARQ feedback or before transmitting the second HARQ feedback.

In one embodiment, the statement that "the second HARQ feedback is used for the first bit block" in the claims includes the following meaning: the second HARQ feedback is used for indicating that the first PDSCH is falsely decoded or falsely received.

In one embodiment, the statement that "the second HARQ feedback is used for the first bit block" in the claims includes the following meaning: the second HARQ feedback is used for indicating that the first PDSCH is falsely decoded or falsely received after receiving the first PDSCH.

In one embodiment, the statement that "the second HARQ feedback is later than the first PDSCH" in the claims includes the following meaning: a signal or a channel carrying the second HARQ feedback is later than the first PDSCH.

In one embodiment, the statement that "the second HARQ feedback is later than the first PDSCH" in the claims includes the following meaning: a start time for a signal or a channel carrying the second HARQ feedback is later than that of the first PDSCH.

In one embodiment, the statement that "the second HARQ feedback is later than the first PDSCH" in the claims includes the following meaning: a start time for a signal or a channel carrying the second HARQ feedback is later than an end time for the first PDSCH.

In one embodiment, the statement that "the second HARQ feedback is later than the first PDSCH" in the claims includes the following meaning: an end time for a signal or a channel carrying the second HARQ feedback is later than that of the first PDSCH.

In one embodiment, the statement that "the second HARQ feedback is later than the first PDSCH" in the claims includes the following meaning: an earliest time-domain symbol occupied by a signal or a channel carrying the second HARQ feedback is later than a last time-domain symbol occupied by the first PDSCH.

In one embodiment, a time-domain resource occupied by the second HARQ feedback is a time-domain resource occupied by a PUCCH carrying the second HARQ feedback.

In one embodiment, a time-domain resource occupied by the second HARQ feedback are slots and/or time-domain symbols occupied by a PUCCH carrying the second HARQ feedback.

In one embodiment, a frequency-domain resource occupied by the second HARQ feedback is a frequency-domain resource occupied by a PUCCH carrying the second HARQ feedback.

In one embodiment, a frequency-domain resource occupied by the second HARQ feedback are Physical Resource Blocks (PRBs) occupied by a PUCCH carrying the second HARQ feedback.

In one embodiment, a code-domain resource occupied by the second HARQ feedback is a code-domain resource occupied by a PUCCH carrying the second HARQ feedback.

In one embodiment, a code-domain resource occupied by the second HARQ feedback is a sequence used for generating a PUCCH carrying the second HARQ feedback.

In one embodiment, a code-domain resource occupied by the second HARQ feedback refers to the second sequence set in the present disclosure.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used by the first node in the present disclosure to determine at least one of a time-domain resource occupied by the second HARQ feedback, a frequency-domain resource occupied by the second HARQ feedback or a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for explicitly or implicitly indicating at least one of a time-domain resource occupied by the second HARQ feedback, a frequency-domain resource occupied by the second HARQ feedback or a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining one of a time-domain resource occupied by the second HARQ feedback, a frequency-domain resource occupied by the second HARQ feedback or a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining a time-domain resource occupied by the second HARQ feedback, a frequency-domain resource occupied by the second HARQ feedback and a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining a time-domain resource occupied by the second HARQ feedback and a frequency-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining a frequency-domain resource occupied by the second HARQ feedback and a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining a time-domain resource occupied by the second HARQ feedback and a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining a value of a PUCCH Resource Indicator (PUCCH PRI) carrying the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining a time-domain resource occupied by the first PDSCH, the time-domain resource occupied being used to determine a time-domain resource for a PUCCH carrying the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining a time-domain resource occupied by the first PDSCH, the first PDCCH being used to determine a time-domain interval between the time-domain resource occupied by the first PDSCH and a time-domain resource for a PUCCH carrying the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: the first PDCCH is used for determining a time-frequency resource occupied by the first PDSCH, the time-frequency resource occupied being used to determine at least one of a time-domain resource occupied by the second HARQ feedback, a frequency-domain resource occupied by the second HARQ feedback or a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: scheduling information for the first PDSCH is used for determining at least one of a time-domain resource occupied by the second HARQ feedback, a frequency-domain resource occupied by the second HARQ feedback or a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: scheduling information for the first PDSCH comprises a PUCCH Resource Indicator (PUCCH PRI) carrying the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: an index for an initial Control Channel Element (CCE) occupied by the first PDCCH is used to determine at least one of a time-domain resource occupied by the second HARQ feedback, a frequency-domain resource occupied by the second HARQ feedback or a code-domain resource occupied by the second HARQ feedback.

In one embodiment, the statement that "the first PDCCH is used to determine at least one of a time-domain resource occupied by the second HARQ feedback, a frequency-domain resource occupied by the second HARQ feedback or a code-domain resource occupied by the second HARQ feedback" in the claims includes the following meaning: The first PDCCH is used to determine a target resource from W1 candidate resources, where W1 is a positive integer greater than 1, the target resource comprising at least one of a time-domain resource occupied by the second HARQ feedback, a frequency-domain resource occupied by the second HARQ feedback or a code-domain resource occupied by the second HARQ feedback; any of the W1 candidate resources comprises at least one of a time-domain resource, a frequency resource or a code-domain resource. In one subsidiary embodiment of the above embodiment, the W1 candidate resources are pre-defined. In one subsidiary embodiment of the above embodiment, the W1 candidate resources are configurable. In one subsidiary embodiment of the above embodiment, the first information block in the present disclosure is used for configuring the W1 candidate resources. In one subsidiary embodiment of the above embodiment, an information block other than the first information block in the present disclosure is used for configuring the W1 candidate resources.

Embodiment 2

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LIE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR/evolved node B (gNB/eNB) 203 and other gNBs (eNBs) 204. The gNB(eNB) 203 provides UE 201 oriented user plane and control plane terminations. The gNB(eNB) 203 may be connected to other gNBs(eNBs) 204 via an Xn/X2 interface (for example, backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, test equipment, test instrument or test tools, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 supports multicast or broadcast traffic transmission.

In one embodiment, the gNB(eNB) 203 corresponds to the second node in the present disclosure.

In one embodiment, the gNB(eNB) 203 supports multicast or broadcast traffic transmission.

Embodiment 3

Figure 3:
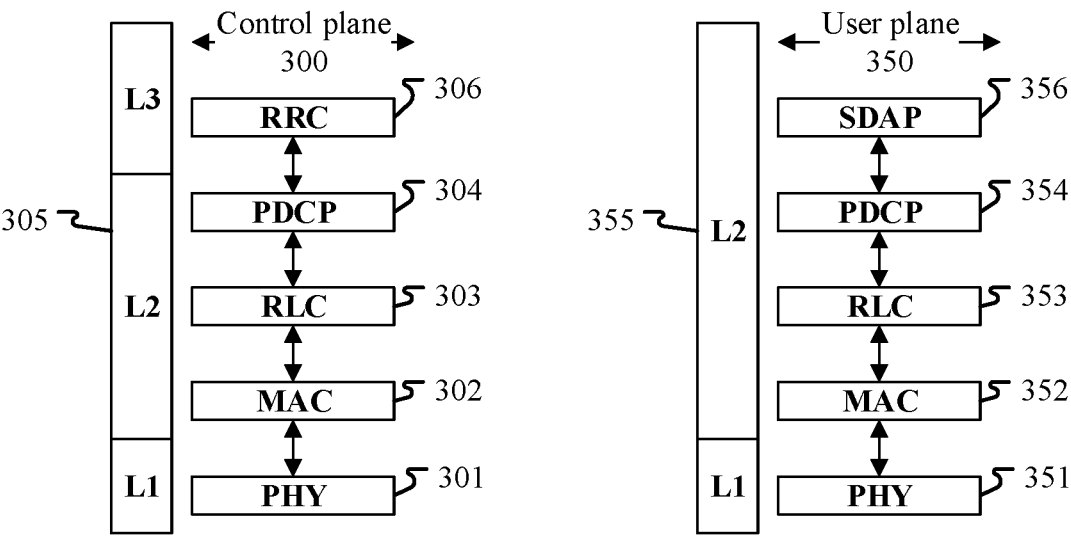
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 used for a first node (UE or gNB) and a second node (gNB or UE) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between a first node and a second node via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the first node in the present disclosure.

In one embodiment, the first HARQ feedback in the present disclosure is generated by the PHY301 or the PHY351.

In one embodiment, the first PDCCH in the present disclosure is generated by the PHY301 or the PHY351.

In one embodiment, the second HARQ feedback in the present disclosure is generated by the PHY301 or the PHY351.

In one embodiment, the first PDSCH in the present disclosure is generated by the RRC306, or the MAC302, or the MAC352, or by the PHY301, or the PHY351.

In one embodiment, the first information block in the present disclosure is generated by the RRC306, or the MAC302, or the MAC352, or by the PHY301, or the PHY351.

In one embodiment, the second PDCCH in the present disclosure is generated by the PHY301 or the PHY351.

Embodiment 4

Figure 4:
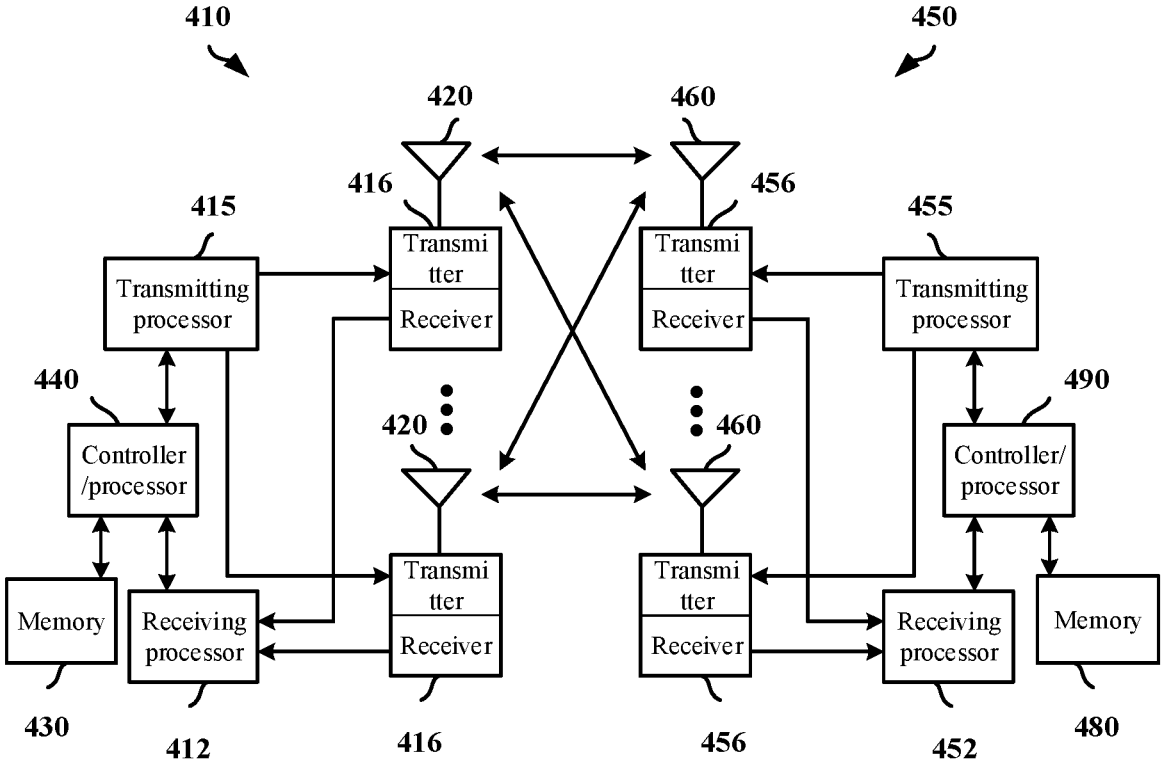
FIG. 4 illustrates a schematic diagram of a first node and a second node according to one embodiment of the present disclosure.

Embodiment 4 illustrates a schematic diagram of a first node and a second node according to one embodiment of the present disclosure, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher layer packet, for instance upper-layer information contained in the first information block and the first PDSCH in the present disclosure is provided to the controller/processor 440. The controller/processor 440 provides functions of the L2 layer and above. In DL, the controller/processor 440 provides header compression, encryption, packet segmentation and reordering, multiplexing between a logical channel and a transport channel as well as radio resources allocation for the first node 450 based on various priorities. The controller/processor 440 is also responsible for HARQ operation, a retransmission of a lost packet and a signaling to the first node 450, for instance, higher-layer information carried in the first information block and the first PDSCH in the present disclosure is generated in the controller/processor 440. The transmitting processor 415 performs various signal processing functions used for the L1 (that is, PHY), including coding, interleaving, scrambling, modulating, power control/allocating, pre-coding and physical layer control signaling generation, for example, the generations of a physical layer signal for the first PDCCH, a physical layer signal for the second PDCCH, a physical layer signal for the first PDSCH and a physical layer signal carrying the first information block in the present disclosure are completed in the transmitting processor 415. Modulation symbols that have been generated are divided into parallel streams and each of them is mapped onto a corresponding multicarrier subcarrier and/or multicarrier symbol, and then is mapped by the transmitting processor 415 to the antenna 420 via the transmitter 416 to be transmitted in the form of radio frequency signals. At the receiving end, each receiver 456 receives a radio frequency signal via a corresponding antenna 460, and recovers baseband information modulated onto a radio frequency carrier and provides the baseband information to the receiving processor 452. The receiving processor 452 performs various signal receiving processing functions used for the L1. Signal receiving processing functions include receiving of physical layer signals for the first PDCCH, for the second PDCCH, for the first PDSCH and carrying the first information block in the present disclosure, and demodulating multicarrier symbols in multicarrier symbol streams based on various modulation schemes (i.E., BPSK, QPSK), then de-scrambling, decoding and de-interleaving to recover data or control signal transmitted by the second node 410 on a physical channel, and providing the data and control signal to the controller/processor 490. The controller/processor 490 is in charge of the L2 and above layers, the controller/processor 490 interprets higher-layer information carried in the first information block and the first PDSCH in the present disclosure. The controller/processor can be associated with the memory 480 that stores program code and data; the memory 480 may be called a computer readable medium.

In UL transmission, which is similar to DL, higher-layer information, upon generation in the controller/processor 490, is through the transmitting processor 455 to perform signal transmitting processing functions used for the L1 (that is, PHY), for instance, the first HARQ feedback and the second HARQ feedback in the present disclosure are generated in the transmitting processor 455, and are then mapped to the antenna 460 via the transmitter 456 from the transmitting processor 455 and transmitted in the form of radio frequency signals. The receiver 416 receives a radio frequency signal via a corresponding antenna 420, and each receiver 416 recovers baseband information modulated onto a radio frequency carrier and provides the baseband information to the receiving processor 412. The receiving processor 412 provides various signal receiving processing functions used for the L1 (that is, PHY), including receiving the first HARQ feedback and the second HARQ feedback in the present disclosure, and then providing the data and/or control signal to the controller/processor 440. The functionality implemented by the controller/processor 440 includes interpretation of higher-layer information. The controller/processor can be associated with the buffer 430 that stores program code and data; the buffer 430 may be called a computer readable medium.

In one embodiment, the first node 450 comprises at least one processor and at least one memory, the at least one memory comprises computer program codes; The at least one memory and the computer program codes are configured to be used in collaboration with the at least one processor. The first node 450 at least transmits a first HARQ feedback, the first HARQ feedback being used to indicate either an ACK or a NACK; receives a first PDCCH, the first PDCCH being used to determine scheduling information for a first PDSCH; and determines whether a target condition is fulfilled, and, when the target condition is fulfilled, transmitting a second HARQ feedback, the second HARQ feedback being only used to indicate a NACK; herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine the target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback.

In one embodiment, the first node 450 comprises a memory that stores a computer readable instruction program, the computer readable instruction program generates actions when executed by at least one processor, which include: transmitting a first HARQ feedback, the first HARQ feedback being used to indicate either an ACK or a NACK; receiving a first PDCCH, the first PDCCH being used to determine scheduling information for a first PDSCH; and determining whether a target condition is fulfilled, and, when the target condition is fulfilled, transmitting a second HARQ feedback, the second HARQ feedback being only used to indicate a NACK; herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine the target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback.

In one embodiment, the second device 410 comprises at least one processor and at least one memory, the at least one memory comprises computer program codes; the at least one memory and the computer program codes are configured to be used in collaboration with the at least one processor. The second device 410 at least: receives a first HARQ feedback, the first HARQ feedback being used to indicate either an ACK or a NACK; transmits a first PDCCH, the first PDCCH being used to determine scheduling information for a first PDSCH; and monitors a second HARQ feedback, the second HARQ feedback being only used to indicate a NACK; herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine a target condition, when the target condition is fulfilled the second HARQ feedback is transmitted; the second HARQ feedback is used for the first bit block, and the second HARQ feedback is no earlier than the first PDSCH, the first PDCCH is used to indicate at least one of a time-domain resource occupied by the second HARQ feedback, a frequency-domain resource occupied by the second HARQ feedback or a code-domain resource occupied by the second HARQ feedback.

In one embodiment, the second node 410 comprises a memory that stores a computer readable instruction program, the computer readable instruction program generates actions when executed by at least one processor, which include: receiving a first HARQ feedback, the first HARQ feedback being used to indicate either an ACK or a NACK; transmitting a first PDCCH, the first PDCCH being used to determine scheduling information for a first PDSCH; and monitoring a second HARQ feedback, the second HARQ feedback being only used to indicate a NACK; herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine a target condition, when the target condition is fulfilled the second HARQ feedback is transmitted; the second HARQ feedback is used for the first bit block, and the second HARQ feedback is no earlier than the first PDSCH, the first PDCCH is used to indicate at least one of a time-domain resource occupied by the second HARQ feedback, a frequency-domain resource occupied by the second HARQ feedback or a code-domain resource occupied by the second HARQ feedback.

In one embodiment, the first node 450 is a UE.

In one embodiment, the first node 450 is a UE supporting multicast or broadcast services.

In one embodiment, the second node 410 is a base station (gNB/eNB).

In one embodiment, the second node 410 is a UE supporting multicast or broadcast services.

In one embodiment, the transmitter 456 (comprising the antenna 460) and the transmitting processor 455 are used for transmitting the first HARQ feedback in the present disclosure.

In one embodiment, the transmitter 456 (comprising the antenna 460) and the receiving processor 452 are used for receiving the first PDCCH in the present disclosure.

In one embodiment, when the first node 450 transmits the second HARQ feedback, the transmitter 456 (comprising the antenna 460) and the transmitting processor 455 are used for transmitting the second HARQ feedback in the present disclosure.

In one embodiment, when the first node 450 receives the first PDSCH, the receiver 456 (comprising the antenna 460), the receiving processor 452 and the controller/processor 490 are used for receiving the first PDSCH in the present disclosure.

In one embodiment, the receiver 456 (comprising the antenna 460), the receiving processor 452 and the controller/processor 490 are used for receiving the first information block in the present disclosure.

In one embodiment, the transmitter 456 (comprising the antenna 460) and the receiving processor 452 are used for receiving the second PDCCH in the present disclosure.

In one embodiment, the receiver 416 (comprising the antenna 420) and the receiving processor 412 are used for receiving the first HARQ feedback in the present disclosure.

In one embodiment, the transmitter (comprising the antenna 420) and the transmitting processor 415 are used for transmitting the first PDCCH in the present disclosure.

In one embodiment, the receiver 416 (comprising the antenna 420) and the receiving processor 412 are used for monitoring the second HARQ feedback in the present disclosure.

In one embodiment, the transmitter 416 (comprising the antenna 420), the transmitting processor 415 and the controller/processor 440 are used for transmitting the first PDSCH in the present disclosure.

In one embodiment, the transmitter 416 (comprising the antenna 420), the transmitting processor 415 and the controller/processor 440 are used for transmitting the first information block in the present disclosure.

In one embodiment, the transmitter (comprising the antenna 420) and the transmitting processor 415 are used for transmitting the second PDCCH in the present disclosure.

Embodiment 5

Figure 5:
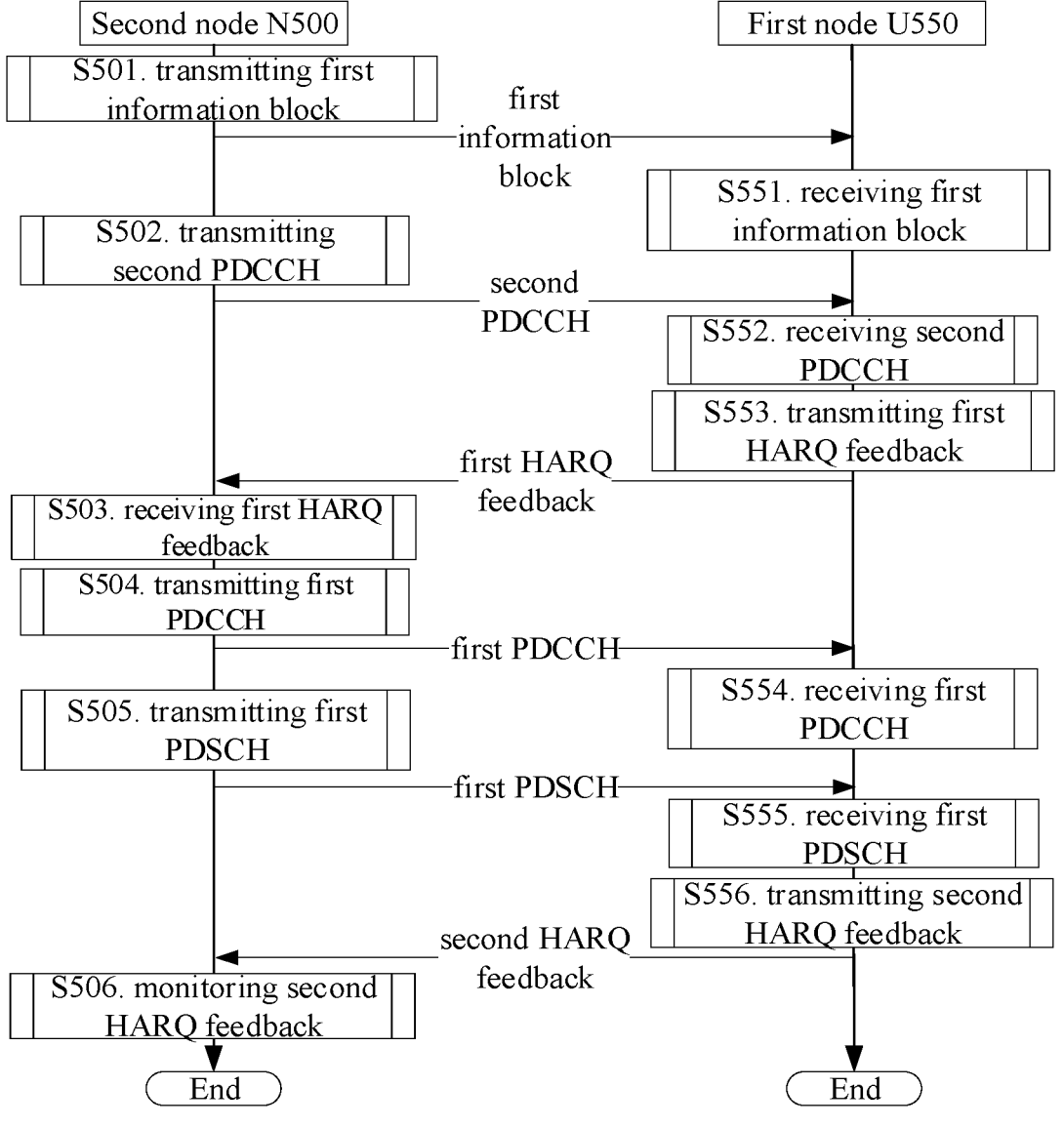
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a second node N500 is a maintenance base station for a serving cell for a first node U550. It should be particularly noted that the sequence illustrated herein does not set any limit to the signal transmission order or implementation order in the present disclosure.

The second node N500 transmits a first information block in step S501, and transmits a second PDCCH in step S502, receives a first HARQ feedback in step S503, transmits a first PDCCH in step S504, and transmits a first PDSCH in step S505, and monitors a second HARQ feedback in step S506.

The first node U550 receives a first information block in step S551, and receives a second PDCCH in step S552, transmits a first HARQ feedback in step S553, receives a first PDCCH in step S554, and receives a first PDSCH in step S555, and transmits a second HARQ feedback in step S556.

In Embodiment 5, the first HARQ feedback is used to indicate either an ACK or a NACK; the first PDCCH is used to determine scheduling information for a first PDSCH; and the second HARQ feedback is only used to indicate a NACK; the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine a target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback; the first information block is used to determine G1 candidate resource blocks, with a first resource block being one of the G1 candidate resource blocks, G1 being a positive integer greater than 1, the second PDCCH is used to determine the first resource block out of the G1 candidate resource blocks; the first HARQ feedback occupies a target resource block, the first resource block being used to determine the target resource block.

In one embodiment, the first information block is transmitted via an air interface or a wireless interface.

In one embodiment, the first information block comprises all or part of a higher layer signaling or a physical layer signaling.

In one embodiment, the first information block comprises all or part of a Radio Resource Control (RRC) layer signaling or a Medium Access Control (MAC) layer signaling.

In one embodiment, the first information block comprises all or part of a System Information Block (SIB).

In one embodiment, the first information block is Cell Specific or UE-specific.

In one embodiment, the first information block is Per Bandwidth-Part (BWP) Configured.

In one embodiment, the first information block comprises all or partial fields in a Downlink Control Information (DCI) signaling.

In one embodiment, the first information block comprises more than one sub-information block, and each sub-information block comprised in the first information block is an Information Element (IE) or a field in an RRC signaling to which the first information belongs; one or more sub-information blocks comprised in the first information block is or are used to determine a relative relation between the first resource block and the reference resource block.

In one embodiment, the first information block is UE group specific or multicast group specific.

In one embodiment, the first information block comprises all or partial fields in an Information Element (IE) of "PUCCH-ConfigMulticast" in an RRC signaling.

In one embodiment, the first information block comprises all or partial fields in an Information Element (IE) of "PUCCH-ConfigCommon" in an RRC signaling.

In one embodiment, the first information block comprises all or partial fields in an Information Element (IE) of "BWP-UplinkDedicated" in an RRC signaling.

In one embodiment, the first information block comprises all or partial fields in an Information Element (IE) of "PUCCH-Config" in an RRC signaling.

In one embodiment, the first information block comprises either a field "dl-DataToUL-ACK" or a field "dl-DataToUL-ACK-r16" in an Information Element (IE) of "PUCCH-Config" in an RRC signaling.

In one embodiment, the first information block comprises either a field "resourceToAddModList" or a field "resourceToReleaseList" in an Information Element (IE) of "PUCCH-Config" in an RRC signaling.

In one embodiment, the first information block comprises either a field "resourceSetToAddModList" or a field "resource SetToReleaseList" in an Information Element (IE) of "PUCCH-Config" in an RRC signaling.

In one embodiment, the statement in the claims that "the first information block is used to determine G1 candidate resource blocks" includes the following meaning: the first information block is used by the first node in the present disclosure for determining the G1 candidate resource blocks.

In one embodiment, the statement in the claims that "the first information block is used to determine G1 candidate resource blocks" includes the following meaning: the first information block is used for explicitly or implicitly indicating the G1 candidate resource blocks.

In one embodiment, the statement in the claims that "the first information block is used to determine G1 candidate resource blocks" includes the following meaning: the second PDCCH indicates a reference resource block, the first information block being used to indicate relative relations respectively between the G1 candidate resource blocks and the reference block.

In one embodiment, the second PDCCH comprises a baseband signal or a radio frequency signal in a Physical Downlink Control Channel (PDCCH).

In one embodiment, the second PDCCH carries Downlink Control Information (DCI).

In one embodiment, a DCI-format DCI Payload is used for generating the second PDCCH.

In one embodiment, the second PDCCH occupies a PDCCH Candidate.

In one embodiment, the second PDCCH occupies a positive integer number of Control Channel Element(s) (CCE (s)).

In one embodiment, the number of CCE(s) occupied by the second PDCCH is equal to one of 1, 2, 4, 8 or 16.

In one embodiment, the second PDCCH is a PDCCH scheduling a Physical Downlink Shared Channel (PDSCH), or the second PDCCH is a PDCCH used for a Semi-Persistent Scheduling (SPS) PDSCH Release.

In one embodiment, the second PDCCH is a PDCCH scheduling a Unicast PDSCH.

In one embodiment, the second PDCCH is a PDCCH used for multicast or broadcast.

In one embodiment, the second PDCCH is a PDCCH scheduling a multicast or broadcast PDSCH.

In one embodiment, the second PDCCH is a PDCCH scheduling a PDSCH, an RNTI other than a Cell-Radio Network Temporary Identifier (C-RNTI) is used to initialize a scrambling generator for a PDSCH scheduled by the first PDCCH.

In one embodiment, CRC of the second PDCCH is scrambled by a C-RNTI.

In one embodiment, CRC of the second PDCCH is scrambled by an RNTI other than a C-RNTI.

In one embodiment, DCI carried by the first PDCCH is of a same Format as that carried by the second PDCCH.

In one embodiment, DCI carried by the first PDCCH is of a different Format from that carried by the second PDCCH.

In one embodiment, an RNTI scrambling the CRC of the first PDCCH is the same as an RNTI scrambling the CRC of the second PDCCH.

In one embodiment, an RNTI scrambling the CRC of the first PDCCH is the different from an RNTI scrambling the CRC of the second PDCCH.

Embodiment 6

Figure 6:
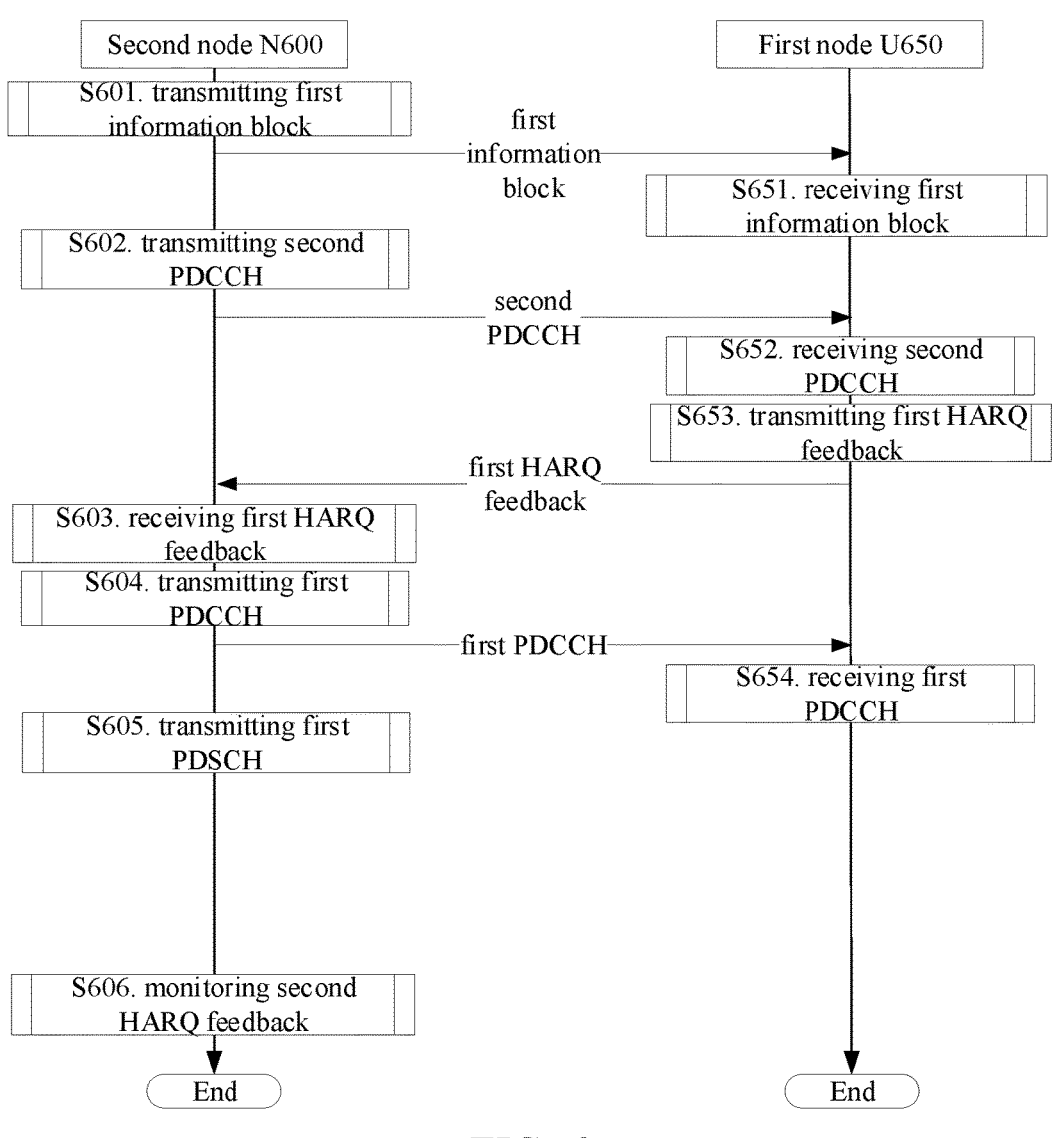
FIG. 6 illustrates a flowchart of radio signal transmission according to another embodiment of the present disclosure.

Embodiment 6 illustrates a flowchart of signal transmission according to another embodiment of the present disclosure, as shown in FIG. 6. In FIG. 6, a second node N600 is a maintenance base station for a serving cell for a first node U650. It should be particularly noted that the sequence illustrated herein does not set any limit to the signal transmission order or implementation order in the present disclosure.

The second node N600 transmits a first information block in step S601, and transmits a second PDCCH in step S602, receives a first HARQ feedback in step S603, transmits a first PDCCH in step S604, transmits a first PDSCH in step S605, and monitors a second HARQ feedback in step S606.

The first node U650 receives a first information block in step S651, and receives a second PDCCH in step S652, transmits a first HARQ feedback in step S653, and receives a first PDCCH in step S654.

Embodiment 7

Figure 7:
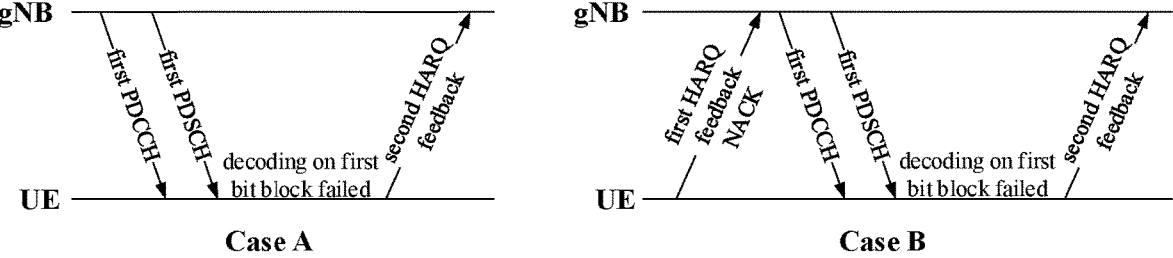
FIG. 7 illustrates a schematic diagram of a target condition according to one embodiment of the present disclosure.

Embodiment 7 illustrates a schematic diagram of a target condition according to one embodiment of the present disclosure, as shown in FIG. 7. In Case A and Case B of FIG. 7, the upper line represents gNB, while the bottom line represents UE, between two lines each arrowed line represents a transmitted signal or transmission channel, with the arrow pointing in a transmission direction; as depicted in Case A, the first PDSCH is received and the decoding of the first bit block is failed; as depicted in Case B, the first HARQ feedback indicates a NACK and the decoding of the first bit block is failed.

In Embodiment 7, the first HARQ feedback in the present disclosure is used to determine whether the first PDSCH in the present disclosure is to be received, the target condition in the present disclosure comprising that: the first PDSCH is received and decoding on the first bit block in the present disclosure is failed; or the first receiver receives the first PDSCH, the target condition comprising that: the first HARQ feedback indicates a NACK and the decoding on the first bit block is failed.

In one embodiment, the first HARQ feedback is used to determine whether the first PDSCH is to be received, the target condition comprising that: the first PDSCH is received and the first bit block is incorrectly decoded after the reception of the first PDSCH.

In one embodiment, the first HARQ feedback is used to determine whether the first PDSCH is to be received, the target condition comprising that: the first bit block is incorrectly decoded after reception of the first PDSCH.

In one embodiment, the first receiver receives the first PDSCH, the target condition comprising that: the first HARQ feedback indicates a NACK and the first bit block is incorrectly decoded after reception of the first PDSCH.

In one embodiment, the statement that "the first HARQ feedback is used to determine whether the first PDSCH is to be received" in the claims includes the following meaning: the first HARQ feedback is used by the first node in the present disclosure for determining whether the first PDSCH is to be received.

In one embodiment, the statement that "the first HARQ feedback is used to determine whether the first PDSCH is to be received" in the claims includes the following meaning: the first HARQ feedback is used to determine whether receiving the first PDSCH is canceled.

In one embodiment, the statement that "the first HARQ feedback is used to determine whether the first PDSCH is to be received" in the claims includes the following meaning: the first HARQ feedback is used to determine whether to drop decoding the first bit block carried by the first PDSCH.

In one embodiment, the statement that "the first HARQ feedback is used to determine whether the first PDSCH is to be received" in the claims includes the following meaning: the first HARQ feedback is used to determine whether the first PDSCH is to be received according to a conditional relation.

In one embodiment, the statement that "the first HARQ feedback is used to determine whether the first PDSCH is to be received" in the claims includes the following meaning: when the first HARQ feedback indicates an ACK, the first node in the present disclosure drops receiving the first PDSCH; when the first HARQ feedback indicates a NACK, the first node in the present disclosure receives the first PDSCH.

In one embodiment, the statement that "the first HARQ feedback is used to determine whether the first PDSCH is to be received" in the claims includes the following meaning: when the first HARQ feedback indicates an ACK, the first node in the present disclosure drops decoding the first bit block carried by the first PDSCH; when the first HARQ feedback indicates a NACK, the first node in the present disclosure decodes the first bit block carried by the first PDSCH.

In one embodiment, receiving the first PDSCH means receiving a radio frequency signal of the first PDSCH.

In one embodiment, receiving the first PDSCH means decoding bit block(s) carried by the first PDSCH.

In one embodiment, receiving the first PDSCH means receiving a signal on a resource indicated by the first PDCCH, according to scheduling information for the first PDSCH indicated by the first PDCCH.

In one embodiment, the statement that "the decoding on the first bit block is failed" in the claims includes the following meaning: the first bit block having been through decoding does not pass CRC check.

In one embodiment, the statement that "the decoding on the first bit block is failed" in the claims includes the following meaning: decoding of the first bit block is failed after reception of the first PDSCH.

In one embodiment, the statement that "the decoding on the first bit block is failed" in the claims includes the following meaning: decoding of the first bit block is failed before determining whether the target condition is fulfilled.

In one embodiment, the statement that "the decoding on the first bit block is failed" in the claims includes the following meaning: decoding of the first bit block is failed before determining whether the second HARQ feedback is transmitted.

In one embodiment, the statement that "the decoding on the first bit block is failed" in the claims includes the following meaning: decoding of the first bit block having been through combined decoding is failed.

In one embodiment, the statement that "the decoding on the first bit block is failed" in the claims includes the following meaning: after decoding independently performed on a retransmission of the first bit block carried by the first PDSCH, the decoding is failed.

In one embodiment, the statement that "the decoding on the first bit block is failed" in the claims includes the following meaning: having been through combined decoding between an initial transmission and a retransmission carried by the first PDSCH, the decoding of the first bit block is failed.

In one embodiment, the statement that "the decoding on the first bit block is failed" in the claims includes the following meaning: having been through combined decoding between a former transmission of the first PDSCH and a retransmission carried by the first PDSCH, the decoding of the first bit block is failed.

In one embodiment, the statement that "the decoding on the first bit block is failed" in the claims includes the following meaning: having been through combined decoding between soft bits buffered previously in the first PDSCH and soft bits comprised in a retransmission carried by the first PDSCH, the decoding of the first bit block is failed.

Embodiment 8

Embodiment 8 illustrates a schematic diagram illustrating a relation between a first resource block and a target resource block according to one embodiment of the present disclosure, as shown in FIG. 8. In FIG. 8, each rectangular box on the left represents a candidate resource block among G1 candidate resource blocks, the box filled with slashes represents a first resource block, while the box filled with crosses represents a target resource block.

In Embodiment 8, the first information block in the present disclosure is used to determine G1 candidate resource blocks, with a first resource block being one of the G1 candidate resource blocks, G1 being a positive integer greater than 1, the second PDCCH in the present disclosure is used to determine the first resource block out of the G1 candidate resource blocks; the first HARQ feedback in the present disclosure occupies a target resource block, the first resource block being used to determine the target resource block.

In one embodiment, any of the G1 candidate resource blocks comprises at least one of a time-domain resource, a frequency-domain resource or a code-domain (sequence) resource.

In one embodiment, any two of the G1 candidate resource blocks are different.

In one embodiment, time-frequency resources comprised by any two of the G1 candidate resource blocks are different.

In one embodiment, code-domain (sequence) resources comprised by any two of the G1 candidate resource blocks are different.

In one embodiment, there are two candidate resource blocks among the G1 candidate resource blocks comprising a same time-frequency resource.

In one embodiment, there are two candidate resource blocks among the G1 candidate resource blocks comprising a same code-domain (sequence) resource.

In one embodiment, any of the G1 candidate resource blocks is a PUCCH Resource.

In one embodiment, any of the G1 candidate resource blocks corresponds to a PRI.

In one embodiment, any of the G1 candidate resource blocks corresponds to a PDSCH-to-HARQ_feedback timing indicator.

In one embodiment, any of the G1 candidate resource blocks corresponds to a PDSCH-to-HARQ_feedback timing indicator and a PRI.

In one embodiment, G1 is equal to 16.

In one embodiment, G1 is equal to 32.

In one embodiment, G1 is equal to 8.

In one embodiment, G1 is equal to 64.

In one embodiment, G1 is equal to 128.

In one embodiment, G1 is no greater than 128.

In one embodiment, G1 is greater than 128.

In one embodiment, the statement in the claims that "the second PDCCH is used to determine the first resource block out of the G1 candidate resource blocks" includes the following meaning: the second PDCCH is used by the first node in the present disclosure for determining the first resource block out of the G1 candidate resource blocks.

In one embodiment, the statement in the claims that "the second PDCCH is used to determine the first resource block out of the G1 candidate resource blocks" includes the following meaning: the second PDCCH is used for explicitly or implicitly indicating the first resource block from the G1 candidate resource blocks.

In one embodiment, the statement in the claims that "the second PDCCH is used to determine the first resource block out of the G1 candidate resource blocks" includes the following meaning: one or more fields comprised in a DCI Format carried by the second PDCCH is/are used to indicate the first resource block from the G1 candidate resource blocks.

In one embodiment, the statement in the claims that "the second PDCCH is used to determine the first resource block out of the G1 candidate resource blocks" includes the following meaning: a PDSCH-to-HARQ_feedback timing indicator and a PRI comprised in a DCI Format carried by the second PDCCH are used for indicating the first resource block from the G1 candidate resource blocks.

In one embodiment, the statement in the claims that "the second PDCCH is used to determine the first resource block out of the G1 candidate resource blocks" includes the following meaning: the second PDCCH is used to determine a reference resource block, G1 time-domain intervals respectively correspond to the G1 candidate resource blocks, any of the G1 time-domain intervals is a time-domain interval between a corresponding candidate resource block among the G1 candidate resource blocks and the reference resource block, the first resource block corresponds to a first time-domain interval among the G1 time-domain intervals, and the second PDCCH is used to determine the first time-domain interval.

In one embodiment, the statement that "the first HARQ feedback occupies a target resource block" in the claims includes the following meaning: a signal or a channel carrying the first HARQ feedback occupies the target resource block.

In one embodiment, the statement that "the first HARQ feedback occupies a target resource block" in the claims includes the following meaning: a PUCCH or a PUSCH carrying the first HARQ feedback occupies the target resource block.

In one embodiment, the target resource block comprises at least one of a time-domain resource, a frequency-domain resource or a code-domain (sequence) resource.

In one embodiment, the target resource block only comprises a time-domain resource and a frequency-domain resource.

In one embodiment, the statement in the claims of "the first resource block being used to determine the target resource block" includes the following meaning: the first resource block is used by the first node in the present disclosure for determining the target resource block.

In one embodiment, the statement in the claims of "the first resource block being used to determine the target resource block" includes the following meaning: the first resource block and the target resource block are the same.

In one embodiment, the statement in the claims of "the first resource block being used to determine the target resource block" includes the following meaning: the target resource block is the first resource block.

In one embodiment, the statement in the claims of "the first resource block being used to determine the target resource block" includes the following meaning: an index for the first resource block is used to determine an index for the target resource block.

In one embodiment, the statement in the claims of "the first resource block being used to determine the target resource block" includes the following meaning: an index for the first resource block and a first index offset are jointly used to determine an index for the target resource block, where the first index offset is pre-defined, or the first index offset is configurable. In one subsidiary embodiment of the above embodiment, a sum of an index for the first resource block and the first index offset is used to determine an index for the target resource block. In one subsidiary embodiment of the above embodiment, the target resource block is one of G2 candidate resource blocks, G2 being a positive integer greater than 1, an index for the target resource block is equal to a remainder yielded by a sum of an index for the first resource block and the first index offset being divided by the G2. In one subsidiary embodiment of the above embodiment, the first information block in the present disclosure is used for indicating the first index offset. In one subsidiary embodiment of the above embodiment, an information block other than the first information block is used for indicating the first index offset. In one subsidiary embodiment of the above embodiment, an identifier configured for the first node in the present disclosure is used to determine the first index offset. In one subsidiary embodiment of the above embodiment, an index for the first resource block is equal to a value of a corresponding PRI, while an index for the target resource block is equal to a value of a corresponding PRI. In one subsidiary embodiment of the above embodiment, an index for the first resource block is an index for among the G1 candidate resource blocks. In one subsidiary embodiment of the above embodiment, the first resource block and the target resource block occupy a same time-domain resource in time domain.

In one embodiment, the statement in the claims of "the first resource block being used to determine the target resource block" includes the following meaning: a time-domain position of the first resource block is used to determine a time-domain position of the target resource block.

In one embodiment, the statement in the claims of "the first resource block being used to determine the target resource block" includes the following meaning: a time interval length in time domain between the first resource block and the target resource block is equal to a first interval length, the first interval length being pre-defined or configurable. In one subsidiary embodiment of the above embodiment, the first interval length is equal to an interval length of a positive integer number of OFDM symbol(s). In one subsidiary embodiment of the above embodiment, the first information block in the present disclosure is used to determine the first interval length. In one subsidiary embodiment of the above embodiment, an information block other than the first information block is used to determine the first interval length. In one subsidiary embodiment of the above embodiment, a PRI corresponding to the first resource block is equal to a PRI corresponding to the target resource block. In one subsidiary embodiment of the above embodiment, a PRI corresponding to the first resource block is unequal to a PRI corresponding to the target resource block.

In one embodiment, the statement in the claims of "the first resource block being used to determine the target resource block" includes the following meaning: a time-domain position of the first resource block is used to determine a time-domain position of the target resource block, and a PRI corresponding to the first resource block is used to determine a PRI corresponding to the target resource block. In one subsidiary embodiment of the above embodiment, the first information block indicates a relative position relation between the first resource block and the target resource block in time domain, and the first information block is used to determine a difference between a PRI corresponding to the first resource block and a PRI corresponding to the target resource block. In one subsidiary embodiment of the above embodiment, an information block other than the first information block indicates a relative position relation between the first resource block and the target resource block in time domain, and the said information block other than the first information block is used to determine a difference between a PRI corresponding to the first resource block and a PRI corresponding to the target resource block.

Embodiment 9

Embodiment 9 illustrates a schematic diagram of a relation between a first value and a second value according to one embodiment of the present disclosure, as shown in FIG. 9. In FIG. 9, the first row represents what is likely to be contained in the first HARQ feedback, the second row represents possible values of a first value, the third row represents what is likely to be contained in the second HARQ feedback, and the fourth row represents possible values of a second value, where $v_1$ is equal to one of W1 candidate values, and $v_2$ is equal to one of W1 candidate values.

In Embodiment 9, the first HARQ feedback in the present disclosure is used to determine a first value, the first value being equal to one of W1 candidate values, W1 being a positive integer greater than 1; the first value is used to determine a cyclic shift value of sequence(s) comprised in a first sequence set, the first sequence set comprises a positive integer number of sequence(s), and any sequence comprised in the first sequence set is generated by a first basic sequence through cyclic shift; a second value is used for the second HARQ feedback in the present disclosure, and the second value is used to determine a cyclic shift value of sequence(s) comprised in a second sequence set, the second sequence set comprises a positive integer number of sequence(s), and any sequence comprised in the second sequence set is generated by the first basic sequence through cyclic shift; any of the W1 candidate values is a non-negative integer, and the second value is equal to one of the W1 candidate values.

In one embodiment, the first sequence set is used for generating a PUCCH. In one subsidiary embodiment of the above embodiment, PUCCH Format 0 is adopted by a PUCCH generated by the first sequence set. In one subsidiary embodiment of the above embodiment, PUCCH Format 1 is adopted by a PUCCH generated by the first sequence set. In one subsidiary embodiment of the above embodiment, PUCCH Format 2 is adopted by a PUCCH generated by the first sequence set.

In one embodiment, the second sequence set is used for generating a PUCCH. In one subsidiary embodiment of the above embodiment, PUCCH Format 0 is adopted by a PUCCH generated by the second sequence set. In one subsidiary embodiment of the above embodiment, PUCCH Format 1 is adopted by a PUCCH generated by the second sequence set. In one subsidiary embodiment of the above embodiment, PUCCH Format 2 is adopted by a PUCCH generated by the second sequence set.

In one embodiment, a PUCCH Format adopted by a PUCCH generated by the first sequence set is the same as a PUCCH Format adopted by a PUCCH generated by the second sequence set.

In one embodiment, a length of any sequence comprised in the first sequence set is equal to a length of the first basic sequence.

In one embodiment, any sequence comprised in the first sequence set is generated by the first basic sequence through Phase Rotation.

In one embodiment, cyclic shifts that any two sequences comprised in the first sequence set respectively go through are of unequal values.

In one embodiment, there are two sequences in the first sequence set that go through cyclic shifts that are of equal values.

In one embodiment, any two sequences comprised in the first sequence set comprise different elements.

In one embodiment, there are two sequences in the first sequence set that comprise the same elements.

In one embodiment, a length of any sequence comprised in the second sequence set is equal to a length of the first basic sequence.

In one embodiment, any sequence comprised in the second sequence set is generated by the first basic sequence through Phase Rotation.

In one embodiment, cyclic shifts that any two sequences comprised in the second sequence set respectively go through are of unequal values.

In one embodiment, there are two sequences in the second sequence set that go through cyclic shifts that are of equal values.

In one embodiment, any two sequences comprised in the second sequence set comprise different elements.

In one embodiment, there are two sequences in the second sequence set that comprise the same elements.

In one embodiment, the first sequence set and the second sequence set are different from each other.

In one embodiment, the first sequence set and the second sequence set are the same.

In one embodiment, when the first value and the second value are equal, the first sequence set and the second sequence set are the same.

In one embodiment, any sequence comprised in the first sequence set belongs to the second sequence set.

In one embodiment, any sequence comprised in the second sequence set belongs to the first sequence set.

In one embodiment, one of the first sequence set and the second sequence set comprises the other sequence set.

In one embodiment, there is one sequence that only belongs to either of the first sequence set and the second sequence set.

In one embodiment, the statement that "the first HARQ feedback is used to determine a first value" in the claims includes the following meaning: the first HARQ feedback is used by the first node in the present disclosure for determining the first value.

In one embodiment, the statement that "the first HARQ feedback is used to determine a first value" in the claims includes the following meaning: what the first HARQ feedback contains is used to determine the first value.

In one embodiment, the statement that "the first HARQ feedback is used to determine a first value" in the claims includes the following meaning: the first HARQ feedback is used to determine the first value depending on a pre-defined corresponding relation.

In one embodiment, the statement that "the first HARQ feedback is used to determine a first value" in the claims includes the following meaning: when the first HARQ feedback indicates an ACK, the first value is equal to a candidate value among the W1 candidate values; when the first HARQ feedback indicates a NACK, the first value is equal to another candidate value among the W1 candidate values.

In one embodiment, the statement that "the first HARQ feedback is used to determine a first value" in the claims includes the following meaning: a first candidate value and a second candidate value are respectively two candidate values among the W1 candidate values; when the first HARQ feedback indicates an ACK, the first value is equal to the first candidate value; when the first HARQ feedback indicates a NACK, the first value is equal to the second candidate value.

In one embodiment, W1 is equal to 2.

In one embodiment, W1 is equal to 4.

In one embodiment, W1 is greater than 2.

In one embodiment, any of the W1 candidate values is less than 12.

In one embodiment, any of the W1 candidate values is less than a length of a sequence comprised in the first sequence set.

In one embodiment, any two of the W1 candidate values are unequal.

In one embodiment, there are two equal candidate values among the W1 candidate values.

In one embodiment, any of the W1 candidate values is a $m_{cs}$ value.

In one embodiment, any of the W1 candidate values is a $m_0$ value.

In one embodiment, any of the W1 candidate values is a $m_{int}$ value.

In one embodiment, the statement in the claims that "the first value is used to determine a cyclic shift value of sequence(s) comprised in a first sequence set" includes a meaning that: the first value is used by the first node in the present disclosure to determine a cyclic shift value of sequence(s) comprised in the first sequence set.

In one embodiment, the statement in the claims that "the first value is used to determine a cyclic shift value of sequence(s) comprised in a first sequence set" includes a meaning that: the first value is used to determine a cyclic shift value of at least one sequence comprised in the first sequence set.

In one embodiment, the statement in the claims that "the first value is used to determine a cyclic shift value of sequence(s) comprised in a first sequence set" includes a meaning that: the first value is used to calculate a cyclic shift value of sequence(s) comprised in the first sequence set.

In one embodiment, the statement in the claims that "the first value is used to determine a cyclic shift value of sequence(s) comprised in a first sequence set" includes a meaning that: a cyclic shift value of at least one sequence comprised in the first sequence set is linear with the first value.

In one embodiment, the statement in the claims that "the first value is used to determine a cyclic shift value of sequence(s) comprised in a first sequence set" includes a meaning that: a cyclic shift value of at least one sequence comprised in the first sequence set is linear with a target remainder, the target remainder being equal to a remainder yielded by the first value being divided by a length of a sequence comprised in the first sequence set.

In one embodiment, the statement in the claims that "the first value is used to determine a cyclic shift value of sequence(s) comprised in a first sequence set" includes a meaning that: the first value is used to determine a cyclic shift value of sequence(s) comprised in the first sequence set according to a pre-defined function relation.

In one embodiment, the statement in the claims that "the first value is used to determine a cyclic shift value of sequence(s) comprised in a first sequence set" is implemented through the following formula:

$$\alpha_{target\_1} = \frac{2\pi}{N_{seq}}((m_{target\_1} + n_{cs\_1})\mathrm{mod}N_{seq})$$

Herein, $\alpha_{target\_1}$ represents a cyclic shift value of a sequence comprised in the first sequence set, $N_{seq}$ represents a length of a sequence comprised in the first sequence set, $m_{target\_1}$ represents the first value, and $n_{cs\_1}$ represents a value obtained through a pseudo-random sequence.

In one embodiment, the first basic sequence is a Zadoff-Chu (ZC) sequence.

In one embodiment, the first basic sequence is a Computer-Generated Sequence (CGS).

In one embodiment, the first basic sequence is a low Peak to Average Power Ratio (PAPR) sequence.

In one embodiment, the first basic sequence is a Constant Amplitude Zero Auto Correlation (CAZAC) sequence.

In one embodiment, the first basic sequence is a pseudo-random sequence.

In one embodiment, the first basic sequence is pre-defined.

In one embodiment, the first basic sequence is fixed.

In one embodiment, the first basic sequence is configurable.

In one embodiment, the first basic sequence comprises more than one element.

In one embodiment, a length of the first basic sequence is a number of elements comprised in the first basic sequence.

In one embodiment, any element comprised in the first basic sequence is a complex number of modulus equal to 1.

In one embodiment, any element comprised in the first basic sequence is either 0 or 1.

In one embodiment, a length of the first basic sequence is equal to 12.

In one embodiment, a length of the first basic sequence is a positive integral multiple of 6.

In one embodiment, a physical layer cell identifier or an identifier configured by higher-layer signaling is used for determining the first basic sequence.

In one embodiment, the statement that "a second value is used for the second HARQ feedback" in the claims includes the following meaning: the second value is pre-defined as being used for the second HARQ feedback.

In one embodiment, the statement that "a second value is used for the second HARQ feedback" in the claims includes the following meaning: the second value is used by the first node in the present disclosure for the second HARQ feedback.

In one embodiment, the statement that "a second value is used for the second HARQ feedback" in the claims includes the following meaning: the second value is used for generating a signal or a channel carrying the second HARQ feedback.

In one embodiment, the statement that "a second value is used for the second HARQ feedback" in the claims includes the following meaning: the second value corresponds to the second HARQ feedback.

In one embodiment, the statement that "a second value is used for the second HARQ feedback" in the claims includes the following meaning: the second value is for the second HARQ feedback.

In one embodiment, the statement that "a second value is used for the second HARQ feedback" in the claims includes the following meaning: the second value is configured as being used for the second HARQ feedback.

In one embodiment, the statement that "a second value is used for the second HARQ feedback" in the claims includes the following meaning: the second value is used for indicating the second HARQ feedback.

In one embodiment, the statement that "a second value is used for the second HARQ feedback" in the claims includes the following meaning: when a receiver for the second HARQ feedback receives the second sequence set generated based on the second value, the receiver for the second HARQ feedback determines the second HARQ feedback.

In one embodiment, the statement that "a second value is used for the second HARQ feedback" in the claims includes the following meaning: the second value is adopted by a signal or a channel carrying the second HARQ feedback.

In one embodiment, the statement that "a second value is used for the second HARQ feedback" in the claims includes the following meaning: the second sequence set is adopted by a signal or a channel carrying the second HARQ feedback.

In one embodiment, the statement that "a second value is used for the second HARQ feedback" in the claims includes the following meaning: the second sequence set is used for generating a signal or a channel carrying the second HARQ feedback.

In one embodiment, the second value being used for the second HARQ feedback is pre-defined, or is configured.

In one embodiment, the statement in the claims that "the second value is used to determine a cyclic shift value of sequence(s) comprised in a second sequence set" includes a meaning that: the second value is used by the first node in the present disclosure to determine a cyclic shift value of sequence(s) comprised in the second sequence set.

In one embodiment, the statement in the claims that "the second value is used to determine a cyclic shift value of sequence(s) comprised in a second sequence set" includes a meaning that: the second value is used to determine a cyclic shift value of at least one sequence comprised in the second sequence set.

In one embodiment, the statement in the claims that "the second value is used to determine a cyclic shift value of sequence(s) comprised in a second sequence set" includes a meaning that: the second value is used to calculate a cyclic shift value of sequence(s) comprised in the second sequence set.

In one embodiment, the statement in the claims that "the second value is used to determine a cyclic shift value of sequence(s) comprised in a second sequence set" includes a meaning that: a cyclic shift value of at least one sequence comprised in the second sequence set is linear with the second value.

In one embodiment, the statement in the claims that "the second value is used to determine a cyclic shift value of sequence(s) comprised in a second sequence set" includes a meaning that: a cyclic shift value of at least one sequence comprised in the second sequence set is linear with a characteristic remainder, the characteristic remainder being equal to a remainder yielded by the second value being divided by a length of a sequence comprised in the second sequence set.

In one embodiment, the statement in the claims that "the second value is used to determine a cyclic shift value of sequence(s) comprised in a second sequence set" includes a meaning that: the second value is used to determine a cyclic shift value of sequence(s) comprised in the second sequence set according to a pre-defined function relation.

In one embodiment, the statement in the claims that "the second value is used to determine a cyclic shift value of sequence(s) comprised in a second sequence set" is implemented through the following formula:

$$\alpha_{target\_2} = \frac{2\pi}{N_{seq}}((m_{target\_2} + n_{cs\_2}) \mathrm{mod} N_{seq})$$

Herein, $\alpha_{target\_2}$ represents a cyclic shift value of a sequence comprised in the second sequence set, $N_{seq}$ represents a length of a sequence comprised in the second sequence set, $m_{target\_2}$ represents the second value, and $n_{cs\_2}$ represents a value obtained through a pseudo-random sequence.

In one embodiment, the first value and the second value are equal.

In one embodiment, the first value and the second value are unequal.

In one embodiment, the second value is default, or is fixed.

In one embodiment, the second value is configurable.

In one embodiment, when the first HARQ feedback indicates a NACK, the first value is equal to the second value.

In one embodiment, when the first HARQ feedback indicates an ACK, the first value is equal to the second value.

Embodiment 10

Embodiment 10 illustrates a schematic diagram of a relation between a target multicarrier symbol and a target sequence according to one embodiment of the present disclosure, as shown in FIG. 10. In FIG. 10, the horizontal axis represents time, and the vertical axis represents frequency, each small box represents an RE occupied by a target PUCCH, each slash-filled box represents an RE occupied by a target RE set, blank rectangles marked with CSi, i=0, 1, 2, 3 represent four cyclic shift values respectively adopted by four sequences.

In Embodiment 10, a target PUCCH is used for carrying the second HARQ feedback in the present disclosure, the target PUCCH occupying X1 multicarrier symbols in time domain, where X1 is a positive integer greater than 1; a target multicarrier symbol is one of the X1 multicarrier symbols, a target RE set comprises multiple REs occupied by the target PUCCH, any RE comprised in the target RE set occupying the target multicarrier symbol in time domain; a target sequence is used for generating a complex-valued symbol mapped onto the target RE set, a time-domain position of the target multicarrier symbol is used to determine the target sequence.

In one embodiment, the target PUCCH comprises a radio frequency signal for Physical Uplink Control Channel (PUCCH) or a baseband signal for PUCCH.

In one embodiment, the target PUCCH carries Uplink control information (UCI).

In one embodiment, the target PUCCH comprises a reference signal.

In one embodiment, the target PUCCH comprises no reference signal.

In one embodiment, a UCI Format UCI Payload is used for generating the target PUCCH.

In one embodiment, the target PUCCH adopts a PUCCH Format 0.

In one embodiment, the target PUCCH adopts a PUCCH Format 1.

In one embodiment, the target PUCCH adopts a PUCCH Format 2.

In one embodiment, the target PUCCH only occupies one Physical Resource Block (PRB) in frequency domain.

In one embodiment, the target PUCCH occupies more than one Physical Resource Block (PRB) in frequency domain.

In one embodiment, the target PUCCH only occupies one Physical Resource Block (PRB) within a multicarrier symbol in frequency domain.

In one embodiment, time-frequency resource occupied by the target PUCCH is shared by multiple UEs.

In one embodiment, time-frequency resource occupied by the target PUCCH is only used by the first node.

In one embodiment, the target PUCCH being transmitted is used to indicate a NACK, and the target PUCCH not being transmitted is used to indicate an ACK.

In one embodiment, the target PUCCH only occupies the X1 multicarrier symbols in time domain.

In one embodiment, the target PUCCH also occupies one or more multicarrier symbols other than the X1 multicarrier symbols in time domain.

In one embodiment, the statement that "a target PUCCH is used for carrying the second HARQ feedback" in the claims includes the following meaning: the target PUCCH is used by the first node in the present disclosure for carrying the second HARQ feedback.

In one embodiment, the statement that "a target PUCCH is used for carrying the second HARQ feedback" in the claims includes the following meaning: a UCI payload carried by the target PUCCH comprises the second HARQ feedback.

In one embodiment, the statement that "a target PUCCH is used for carrying the second HARQ feedback" in the claims includes the following meaning: the second HARQ feedback is used for generating the target PUCCH.

In one embodiment, the statement that "a target PUCCH is used for carrying the second HARQ feedback" in the claims includes the following meaning: UCI comprising the second HARQ feedback is used for generating the target PUCCH.

In one embodiment, the statement that "a target PUCCH is used for carrying the second HARQ feedback" in the claims includes the following meaning: whether the second HARQ feedback is transmitted is used to determine whether the target PUCCH is transmitted.

In one embodiment, the statement that "a target PUCCH is used for carrying the second HARQ feedback" in the claims includes the following meaning: transmitting of the target PUCCH is used for indicating the second HARQ feedback.

In one embodiment, the statement that "a target PUCCH is used for carrying the second HARQ feedback" in the claims includes the following meaning: whether the target PUCCH is transmitted is used for indicating the second HARQ feedback.

In one embodiment, the statement that "a target PUCCH is used for carrying the second HARQ feedback" in the claims includes the following meaning: the second HARQ feedback is transmitted on the target PUCCH.

In one embodiment, X1 is equal to 2.

In one embodiment, X1 is equal to one of positive integers from 4 to 14.

In one embodiment, any of the X1 multicarrier symbols is an Orthogonal Frequency Division Multiplexing (OFDM) Symbol.

In one embodiment, any of the X1 multicarrier symbols is a Single Carrier-Frequency Division Multiple Access (SC-FDMA) symbol.

In one embodiment, any of the X1 multicarrier symbols is a time-domain symbol.

In one embodiment, any of the X1 multicarrier symbols comprises a Cyclic Prefix (CP) and data part.

In one embodiment, the X1 multicarrier symbols are contiguous in time domain.

In one embodiment, the X1 multicarrier symbols are discrete in time domain.

In one embodiment, any two of the X1 multicarrier symbols are orthogonal.

In one embodiment, any two of the X1 multicarrier symbols belong to a same slot.

In one embodiment, there are two multicarrier symbols among the X1 multicarrier symbols that belong to different slots.

In one embodiment, the first PDCCH is used to determine a time-domain position of a starting multicarrier symbol of the X1 multicarrier symbols.

In one embodiment, scheduling information for the first PDSCH is used to determine a reference multicarrier symbol set, and the scheduling information for the first PDSCH is used to determine a number of multicarrier symbol(s) between an ending multicarrier symbol comprised in the reference multicarrier symbol set and a starting multicarrier symbol of the X1 multicarrier symbols, where the reference multicarrier symbol set comprises a positive integer number of multicarrier symbol(s).

In one embodiment, the first information block in the present disclosure is used to determine the X1.

In one embodiment, an information block other than the first information block in the present disclosure is used to determine the X1.

In one embodiment, the X1 is configurable.

In one embodiment, the target multicarrier symbol is a multicarrier symbol among the X1 multicarrier symbols other than a starting multicarrier symbol.

In one embodiment, the target multicarrier symbol is a starting multicarrier symbol of the X1 multicarrier symbols.

In one embodiment, the target multicarrier symbol is an ending multicarrier symbol of the X1 multicarrier symbols.

In one embodiment, the target multicarrier symbol is any multicarrier symbol of the X1 multicarrier symbols.

In one embodiment, the number of Resource Elements (REs) comprised in the target RE set is greater than 1.

In one embodiment, any RE comprised in the target RE set occupies the target multicarrier symbol in time domain and a subcarrier in frequency domain.

In one embodiment, any RE comprised in the target RE set is occupied by the target PUCCH.

In one embodiment, the target RE set comprises an RE which is not occupied by the target PUCCH.

In one embodiment, the number of REs comprised in the target RE set is equal to 12.

In one embodiment, the target sequence is obtained by a basic sequence being through a cyclic shift.

In one embodiment, the target sequence is obtained by the first basic sequence in the present disclosure being through a cyclic shift.

In one embodiment, the target sequence is a sequence comprised in the second sequence set in the present disclosure.

In one embodiment, the target sequence is a sequence comprised in the second sequence set in the present disclosure by which multicarrier symbol(s) being mapped includes (include) an earliest multicarrier symbol among the X1 multicarrier symbols.

In one embodiment, the target sequence is a sequence comprised in the second sequence set in the present disclosure by which multicarrier symbol(s) being mapped does/do not include an earliest multicarrier symbol among the X1 multicarrier symbols.

In one embodiment, the target sequence is a sequence comprised in the second sequence set in the present disclosure by which multicarrier symbol(s) being mapped only includes(include) (a) multicarrier symbol(s) other than an earliest multicarrier symbol among the X1 multicarrier symbols.

In one embodiment, the target sequence is a sequence comprised in the second sequence set in the present disclosure which goes through a cyclic shift of a minimum value.

In one embodiment, the target sequence is a sequence comprised in the second sequence set in the present disclosure which goes through a cyclic shift of a maximum value.

In one embodiment, the target sequence is a sequence comprised in the second sequence set in the present disclosure which goes through an initial cyclic shift.

In one embodiment, any complex-valued symbol mapped to the target RE set is a complex-valued symbol comprised in a complex valued sequence before mapping to physical resources.

In one embodiment, any complex-valued symbol mapped to the target RE set is a complex-valued symbol comprised in a complex valued sequence in an input to mapping to physical resources.

In one embodiment, any complex-valued symbol mapped to the target RE set is a complex-valued symbol comprised in a complex valued sequence being mapped to physical resources.

In one embodiment, any complex-valued symbol mapped to the target RE set is a complex-valued symbol obtained by Amplitude Scaling of a complex valued sequence before mapping to physical resources.

In one embodiment, any complex-valued symbol mapped to the target RE set is a complex-valued symbol obtained by Amplitude Scaling of a complex valued sequence in an input to mapping to physical resources.

In one embodiment, any complex-valued symbol mapped to the target RE set is a complex-valued symbol after being through Amplitude Scaling.

In one embodiment, any complex-valued symbol mapped to the target RE set is a complex-valued symbol before being through Amplitude Scaling.

In one embodiment, the statement in the claims that "a target sequence is used for generating a complex-valued symbol mapped onto the target RE set" includes the following meaning: the target sequence is used by the first node in the present disclosure for generating a complex-valued symbol mapped onto the target RE set.

In one embodiment, the statement in the claims that "a target sequence is used for generating a complex-valued symbol mapped onto the target RE set" includes the following meaning: an element comprised by the target sequence is a complex-valued symbol mapped onto the target RE set.

In one embodiment, the statement in the claims that "a target sequence is used for generating a complex-valued symbol mapped onto the target RE set" includes the following meaning: a complex-valued symbol mapped onto the target RE set is obtained by the target sequence being through Sequence Modulation.

In one embodiment, the statement in the claims that "a target sequence is used for generating a complex-valued symbol mapped onto the target RE set" includes the following meaning: a complex-valued symbol mapped onto the target RE set is obtained by the target sequence being through Sequence Modulation and Block-wise spread.

In one embodiment, the statement in the claims that "a target sequence is used for generating a complex-valued symbol mapped onto the target RE set" includes the following meaning: The target sequence is a sequence obtained by arranging complex-valued symbols mapped onto the target RE set in an order from lower frequency to higher frequency, or reversely.

In one embodiment, the statement in the claims that "a target sequence is used for generating a complex-valued symbol mapped onto the target RE set" includes the following meaning: Elements comprised in the target sequence, after being through Amplitude Scaling, are mapped onto REs comprised in the target RE set in an order from lower frequency to higher frequency, or reversely.

In one embodiment, the statement in the claims that "a target sequence is used for generating a complex-valued symbol mapped onto the target RE set" includes the following meaning: complex valued symbols obtained by Sequence Modulation of the target sequence are firstly through Amplitude Scaling and then mapped onto REs comprised in the target RE set in an order from lower frequency to higher frequency, or reversely.

In one embodiment, the statement in the claims that "a target sequence is used for generating a complex-valued symbol mapped onto the target RE set" includes the following meaning: complex valued symbols obtained by Sequence Modulation and Block-wise spread of the target sequence are firstly through Amplitude Scaling and then mapped onto REs comprised in the target RE set in an order from lower frequency to higher frequency, or reversely.

In one embodiment, the statement that "a time-domain position of the target multicarrier symbol is used to determine the target sequence" in the claims includes the meaning that: A time-domain position of the target multicarrier symbol is used by the first node in the present disclosure for determining the target sequence.

In one embodiment, the statement that "a time-domain position of the target multicarrier symbol is used to determine the target sequence" in the claims includes the meaning that: an order or an index of the target multicarrier symbol among the X1 multicarrier symbols is used for calculating a value of a cyclic shift of the target sequence.

In one embodiment, the statement that "a time-domain position of the target multicarrier symbol is used to determine the target sequence" in the claims includes the meaning that: an order or an index of the target multicarrier symbol in a slot it belongs to is used for calculating a value of a cyclic shift of the target sequence.

In one embodiment, the statement that "a time-domain position of the target multicarrier symbol is used to determine the target sequence" in the claims includes the meaning that: a time-domain position of the target multicarrier symbol and a pseudo-random sequence are used for calculating a value of a cyclic shift of the target sequence.

In one embodiment, the statement that "a time-domain position of the target multicarrier symbol is used to determine the target sequence" in the claims includes the meaning that: a time-domain position of the target multicarrier symbol is used for calculating a value of $m_{cs}$ of the target sequence.

In one embodiment, the statement that "a time-domain position of the target multicarrier symbol is used to determine the target sequence" in the claims includes the meaning that: a time-domain position of the target multicarrier symbol is used for calculating a value of $m_0$ of the target sequence.

In one embodiment, the statement that "a time-domain position of the target multicarrier symbol is used to determine the target sequence" in the claims includes the meaning that: a time-domain position of the target multicarrier symbol is used for calculating a value of $m_{int}$ of the target sequence.

In one embodiment, the statement that "a time-domain position of the target multicarrier symbol is used to determine the target sequence" in the claims is implemented through the following formula:

$$\alpha_{target} = \frac{2\pi}{N_{seq}}((m_{target} + n_{cs})\bmod N_{seq})$$

Herein, $\alpha_{target}$ represents a cyclic shift value of a target sequence, $N_{seq}$ represents a length of the target sequence, $m_{target}$ represents a value determined by a time-domain position of the target multicarrier symbol, and $n_{cs}$ represents a value obtained through a pseudo-random sequence.

In one embodiment, the statement that "a time-domain position of the target multicarrier symbol is used to determine the target sequence" in the claims is implemented through the following formula:

$$\alpha_{target} = \frac{2\pi}{N_{seq}}\left(\left(m_{target} + n_{cs}\left(n_{s,f}^{\mu}l\right)\right)\bmod N_{seq}\right)$$

Herein, $\alpha_{target}$ represents a cyclic shift value of a target sequence, $N_{seq}$ represents a length of the target sequence, $m_{target}$ represents a default or configurable value, is obtained through the following formula:

$$n_{cs}(n_{s,i}^{\mu}l) = \Sigma_{m=0}^{7} 2^m c(8N_{symb}^{slot} n_{s,i}^{\mu} + 8l + m)$$

Herein, l represents an index for the target multicarrier symbol in a slot to which the symbol belongs, $N_{symb}^{slot}$ represents a number of multicarrier symbol(s) comprised in a slot to which a starting multicarrier symbol among the X1 multicarrier symbols belongs, $n_{s,i}^{\mu}$ represents a number of a slot to which a starting multicarrier symbol among the X1 multicarrier symbols belongs in a Radio Frame, and c(i), i=0, 1, 2, . . . represents a pseudo-random sequence.

In one embodiment, the statement that "a time-domain position of the target multicarrier symbol is used to determine the target sequence" in the claims includes the meaning that: the target sequence is generated by a basic sequence through a cyclic shift, a target parameter being used to determine the cyclic shift for the target sequence; The target parameter is one of X3 candidate parameters, and a time-domain position of the target multicarrier symbol is used to determine the target parameter out of the X3 candidate parameters, where X3 is a positive integer greater than 1. In one subsidiary embodiment of the above embodiment, any of the X3 candidate parameters is a non-negative integer less than a length of a basic sequence which generates the target sequence. In one subsidiary embodiment of the above embodiment, there are two candidate parameters among the X3 candidate parameters between which a difference is no less than half a length of a basic sequence which generates the target sequence. In one subsidiary embodiment of the above embodiment, the X3 candidate parameters are pre-defined, or the X3 candidate parameters are configurable. In one subsidiary embodiment of the above embodiment, any of the X3 candidate parameters is used to determine a cyclic shift value of at least one sequence comprised in the second sequence set. In one subsidiary embodiment of the above embodiment, there are two candidate parameters among the X3 candidate parameters between which a difference is equal to half a length of the basic sequence. In one subsidiary embodiment of the above embodiment, the format of the target PUCCH is used to determine the X3 candidate parameters. In one subsidiary embodiment of the above embodiment, a difference between any two size-wise adjacent candidate parameters among the X3 candidate parameters is equal to a quotient of a length of the target sequence divided by the X3. In one subsidiary embodiment of the above embodiment, none of the X3 candidate parameters is related to a pseudo-random sequence. In one subsidiary embodiment of the above embodiment, when frequency-hopping is adopted by the target PUCCH, a frequency-hopping zone to which the target multicarrier symbol belongs is used to determine the target parameter out of the X3 candidate parameters; otherwise, a position of the target multicarrier symbol among the X1 multicarrier symbols is used to determine the target parameter out of the X3 candidate parameters.

Embodiment 11

Figure 11:
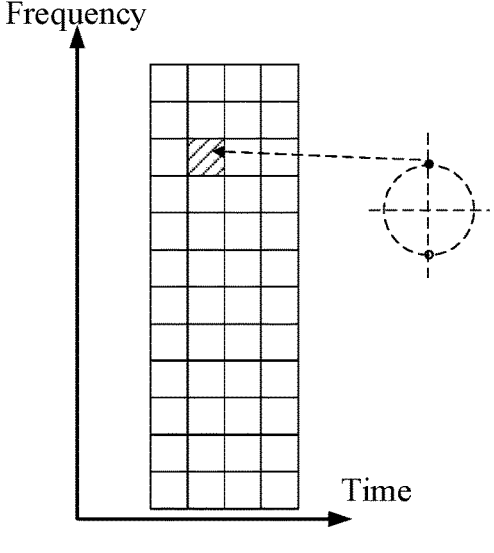
FIG. 11 illustrates a schematic diagram of a target modulation symbol according to one embodiment of the present disclosure.

Embodiment 11 illustrates a schematic diagram of a target modulation symbol according to one embodiment of the present disclosure, as shown in FIG. 11. In FIG. 11, the horizontal axis represents time, while the vertical axis represents frequency; each small box represents an RE occupied by the target PUCCH, the box filled with slashes represents a target RE, the dotted-line circle represents polar coordinates, the solid point represents a target modulation symbol, and the hollow point represents one of X2 modulation symbols other than the target modulation symbol.

In Embodiment 11, X2 modulation symbols are used for generating the target PUCCH in the present disclosure, X2 being a positive integer greater than 1. any two modulation symbols among the X2 modulation symbols employ a same modulation mode, and there are two modulation symbols among the X2 modulation symbols having different phases; a target RE is an RE occupied by the target PUCCH, a target modulation symbol is one of the X2 modulation symbols, and the target modulation symbol is used for generating a complex-value symbol mapped onto the target RE; the target RE occupies the target multicarrier symbol in time domain, a time-domain position of the target multicarrier symbol is used to determine the target modulation symbol.

In one embodiment, X2 is equal to 2.
In one embodiment, X2 is equal to 4.
In one embodiment, X2 is greater than 4.
In one embodiment, X2 is equal to X1.
In one embodiment, X2 is no greater than X1.
In one embodiment, X2 is default or configurable.
In one embodiment, a modulation scheme adopted by any one of the X2 modulation symbols is Binary Phase Shift Keying (BPSK).
In one embodiment, a modulation scheme adopted by any one of the X2 modulation symbols is Pi/2 BPSK.

In one embodiment, a modulation scheme adopted by any one of the X2 modulation symbols is Quadrature Phase Shift Keying (QPSK).

In one embodiment, a modulation scheme adopted by any one of the X2 modulation symbols is Quadrature Phase Shift Keying (Pi/4 QPSK).

In one embodiment, any two of the X2 modulation symbols have different constellation points.

In one embodiment, two complex numbers representing any two of the X2 modulation symbols have different constellation points have different phases in the polar coordinates.

In one embodiment, two complex numbers representing any two of the X2 modulation symbols are unequal.

In one embodiment, there are two of the X2 modulation symbols sharing the same constellation point.

In one embodiment, there are two of the X2 modulation symbols respectively corresponding to two complex numbers that have a same phase in the polar coordinates.

In one embodiment, there are two of the X2 modulation symbols respectively corresponding to two equal complex numbers.

In one embodiment, the X2 modulation symbols are pre-defined.

In one embodiment, the X2 modulation symbols are configurable. In one subsidiary embodiment of the above embodiment, the first information block in the present disclosure is used for configuring the X2 modulation symbols. In one subsidiary embodiment of the above embodiment, a signaling other than the first information block in the present disclosure is used for configuring the X2 modulation symbols.

In one embodiment, the X2 modulation symbols comprise all constellation points in a modulation scheme.

In one embodiment, the X2 modulation symbols only comprise partial constellation points in a modulation scheme.

In one embodiment, the statement in the claims of "X2 modulation symbols are used for generating the target PUCCH" includes the following meaning: the X2 modulation symbols are used by the first node in the present disclosure for generating the target PUCCH.

In one embodiment, the statement in the claims of "X2 modulation symbols are used for generating the target PUCCH" includes the following meaning: the X2 modulation symbols are used for sequence modulation of the target PUCCH.

In one embodiment, the statement in the claims of "X2 modulation symbols are used for generating the target PUCCH" includes the following meaning: the X2 modulation symbols are used together with elements comprised by sequences in the second sequence set for generating one or more complex-valued symbols mapped onto REs occupied by the target PUCCH.

In one embodiment, the statement in the claims of "X2 modulation symbols are used for generating the target PUCCH" includes the following meaning: the X2 modulation symbols, after being used for sequence modulation of sequences comprised in the second sequence set, are used for generating one or more complex-valued symbols mapped onto REs occupied by the target PUCCH.

In one embodiment, the statement in the claims of "X2 modulation symbols are used for generating the target PUCCH" includes the following meaning: a complex valued symbol mapped onto any RE occupied by the target PUCCH is obtained by one of the X2 modulation symbols multiplied by an element comprised by a sequence in the second sequence set then through Block-wise spread and Amplitude scaling.

In one embodiment, the target RE is any RE among all REs occupied by the target PUCCH.

In one embodiment, the target RE is a given RE among all REs occupied by the target PUCCH.

In one embodiment, the target RE is not occupied by a Reference Signal of the target PUCCH.

In one embodiment, the target RE is occupied by a Reference Signal of the target PUCCH.

In one embodiment, a complex valued symbol used for generating the target PUCCH is mapped onto the target RE.

In one embodiment, the target RE is configured to be used for the target PUCCH.

In one embodiment, the target modulation symbol is any one of the X2 modulation symbols.

In one embodiment, the target modulation symbol is one of the X2 modulation symbols that is mapped to the target multicarrier symbol.

In one embodiment, the target modulation symbol is a modulation symbol having a minimum phase among the X2 modulation symbols.

In one embodiment, the target modulation symbol is a modulation symbol having a maximum phase among the X2 modulation symbols.

In one embodiment, the target modulation symbol is a modulation symbol other than a modulation symbol having a minimum phase among the X2 modulation symbols.

In one embodiment, a complex-valued symbol mapped to the target RE is a complex-valued symbol comprised in a complex valued sequence before mapping to physical resources.

In one embodiment, a complex-valued symbol mapped to the target RE is a complex-valued symbol comprised in a complex valued sequence in an input to mapping to physical resources.

In one embodiment, a complex-valued symbol mapped to the target RE is a complex-valued symbol comprised in a complex valued sequence being mapped to physical resources.

In one embodiment, a complex-valued symbol mapped to the target RE is a complex-valued symbol obtained by Amplitude Scaling of a complex valued sequence before mapping to physical resources.

In one embodiment, a complex-valued symbol mapped to the target RE is a complex-valued symbol obtained by Amplitude Scaling of a complex valued sequence in an input to mapping to physical resources.

In one embodiment, a complex-valued symbol mapped to the target RE is a complex-valued symbol having been through Amplitude Scaling.

In one embodiment, a complex-valued symbol mapped to the target RE is a complex-valued symbol before going through Amplitude Scaling.

In one embodiment, the statement in the claims that "the target modulation symbol is used for generating a complex-valued symbol mapped onto the target RE" includes the following meaning: the target modulation symbol is used by the first node in the present disclosure for generating a complex-valued symbol mapped onto the target RE.

In one embodiment, the statement in the claims that "the target modulation symbol is used for generating a complex-valued symbol mapped onto the target RE" includes the following meaning: the target modulation symbol being through Sequence Modulation is used for generating a complex-valued symbol mapped onto the target RE.

In one embodiment, the statement in the claims that "the target modulation symbol is used for generating a complex-valued symbol mapped onto the target RE" includes the following meaning: a product of a complex number representing the target modulation symbol and an element comprised in the target sequence in the present disclosure is used for generating a complex-valued symbol mapped onto the target RE.

In one embodiment, the statement in the claims that "the target modulation symbol is used for generating a complex-valued symbol mapped onto the target RE" includes the following meaning: the target modulation symbol being through Sequence Modulation and then Block-wise Spread is used for generating a complex-valued symbol mapped onto the target RE.

In one embodiment, the statement in the claims that "the target modulation symbol is used for generating a complex-valued symbol mapped onto the target RE" includes the following meaning: a complex-valued symbol mapped onto the target RE is obtained after a complex valued symbol obtained by the target modulation symbol being used for Sequence Modulation goes through Amplitude Scaling.

In one embodiment, the statement in the claims that "the target modulation symbol is used for generating a complex-valued symbol mapped onto the target RE" includes the following meaning: a complex valued symbol obtained by the target modulation symbol being used for Sequence Modulation and then being through Block-wise spread goes through Amplitude Scaling and is mapped onto the target RE.

In one embodiment, the statement that "a time-domain position of the target multicarrier symbol is used to determine the target modulation symbol" in the claims includes the meaning that: a time-domain position of the target multicarrier symbol is used by the first node or the second node in the present disclosure for determining the target modulation symbol.

In one embodiment, the statement that "a time-domain position of the target multicarrier symbol is used to determine the target modulation symbol" in the claims includes the meaning that: a time-domain position of the target multicarrier symbol is used for determining the target modulation symbol out of the X2 modulation symbols.

In one embodiment, the statement that "a time-domain position of the target multicarrier symbol is used to determine the target modulation symbol" in the claims includes the meaning that: a time-domain position of the target multicarrier symbol is used for determining a phase of the target modulation symbol.

In one embodiment, the statement that "a time-domain position of the target multicarrier symbol is used to determine the target modulation symbol" in the claims includes the meaning that: a time-domain position of the target multicarrier symbol is used for determining a phase of a complex number representing the target modulation symbol in polar coordinates.

In one embodiment, the statement that "a time-domain position of the target multicarrier symbol is used to determine the target modulation symbol" in the claims includes the meaning that: an order or an index of the target multicarrier symbol is used to determine the target modulation symbol.

In one embodiment, the statement that "a time-domain position of the target multicarrier symbol is used to determine the target modulation symbol" in the claims includes the meaning that: an order or an index of the target multi-carrier symbol in a slot it belongs to is used to determine the target modulation symbol.

In one embodiment, the statement that "a time-domain position of the target multicarrier symbol is used to determine the target modulation symbol" in the claims includes the meaning that: an order or an index of the target multi-carrier symbol among the X1 multicarrier symbols is used to determine the target modulation symbol.

In one embodiment, the statement that "a time-domain position of the target multicarrier symbol is used to determine the target modulation symbol" in the claims includes the meaning that: an order or an index of the target multi-carrier symbol is used to determine the target modulation symbol according to a mapping relation or corresponding relation or a function relation which is pre-defined.

In one embodiment, the statement that "a time-domain position of the target multicarrier symbol is used to determine the target modulation symbol" in the claims includes the meaning that: The target multicarrier symbol belongs to a first multicarrier symbol group, the first multicarrier symbol group is one of X2 multicarrier symbol groups, and any one of the X2 multicarrier symbol groups comprises a positive integer number of multicarrier symbol(s); the X2 multicarrier symbol groups respectively correspond to the X2 modulation symbols, and the target modulation symbol is one of the X2 modulation symbols corresponding to the first multicarrier symbol group. In one subsidiary embodiment of the above embodiment, any of the X2 multicarrier symbol groups comprises more than one multicarrier symbol. In one subsidiary embodiment of the above embodiment, there is one multicarrier symbol group among the X2 multicarrier symbol groups that only comprises one multi-carrier symbol. In one subsidiary embodiment of the above embodiment, any of the X2 multicarrier symbol groups comprises multiple time-domain consecutive multicarrier symbols. In one subsidiary embodiment of the above embodiment, there is one multicarrier symbol group among the X2 multicarrier symbol groups that comprise multiple time-domain discrete multicarrier symbols.

In one embodiment, whether the target modulation symbol varies with a time-domain position of the target multi-carrier symbol is configurable.

Embodiment 12

Figure 12:
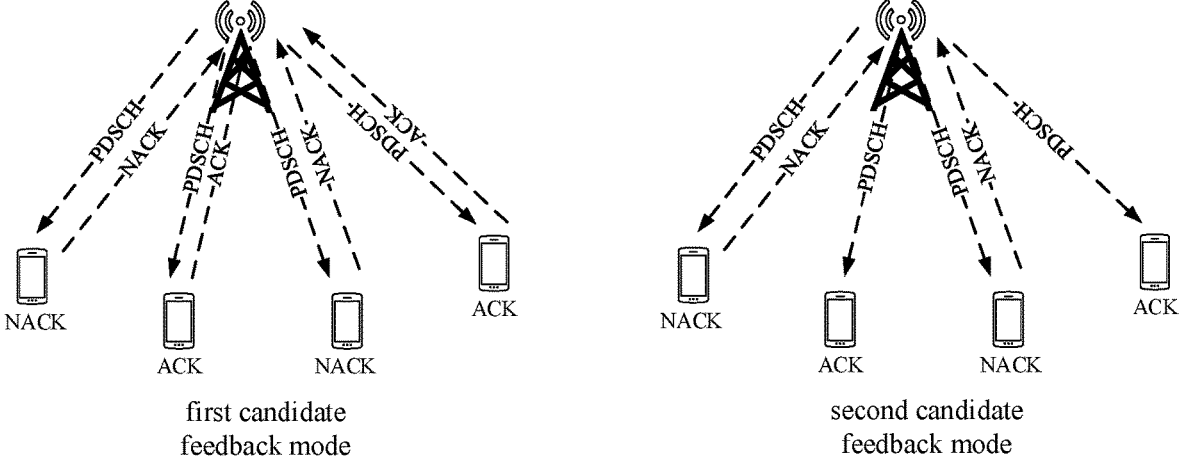
FIG. 12 illustrates a schematic diagram of a first candidate feedback mode and a second candidate feedback mode according to one embodiment of the present disclosure.

Embodiment 12 illustrates a schematic diagram of a first candidate feedback mode and a second candidate feedback mode according to one embodiment of the present disclosure, as shown in FIG. 12. In FIG. 12, when adopting a first candidate feedback mode, the UE sends an ACK or a NACK for feedback according to whether decoding is successful; when adopting a second candidate feedback mode, if the UE successfully decodes a PDSCH, the UE does not send an ACK; when the UE fails in decoding on the PDSCH, the UE sends a NACK.

In Embodiment 12, the first PDCCH in the present disclosure is used to determine that the first PDSCH in the present disclosure carries a retransmission of the first bit block in the present disclosure; the first PDCCH is used to indicate a feedback mode adopted by the second HARQ feedback in the present disclosure, which is either a first candidate feedback mode or a second candidate feedback mode; the HARQ feedback which adopts the first candidate feedback mode comprises one of an ACK or a NACK, while the HARQ feedback which adopts the second candidate feedback mode comprises only a NACK.

In one embodiment, the statement in the claims of "the first PDCCH is used to determine that the first PDSCH carries a retransmission of the first bit block" includes a meaning that: the first PDCCH is used by the first node in the present disclosure to determine that the first PDSCH carries a retransmission of the first bit block.

In one embodiment, the statement in the claims of "the first PDCCH is used to determine that the first PDSCH carries a retransmission of the first bit block" includes a meaning that: one or more fields comprised by a DCI Format carried by the first PDCCH is used for explicitly or implic-itly indicating that the first PDSCH carries a retransmission of the first bit block.

In one embodiment, the statement in the claims of "the first PDCCH is used to determine that the first PDSCH carries a retransmission of the first bit block" includes a meaning that: A New Data Indictor (NDI) comprised by a DCI Format carried by the first PDCCH is used for indicat-ing that the first PDSCH carries a retransmission of the first bit block.

In one embodiment, the statement in the claims of "the first PDCCH is used to determine that the first PDSCH carries a retransmission of the first bit block" includes a meaning that: a New Data Indictor (NDI) comprised by a DCI Format carried by the first PDCCH not being toggled is used for indicating that the first PDSCH carries a retrans-mission of the first bit block.

In one embodiment, the statement that "the first PDCCH is used to indicate a feedback mode adopted by the second HARQ feedback" in the claims includes the following meaning: the first PDCCH explicitly or implicitly indicates a feedback mode adopted by the second HARQ feedback.

In one embodiment, the statement that "the first PDCCH is used to indicate a feedback mode adopted by the second HARQ feedback" in the claims includes the following meaning: one or more fields comprised in a DCI Format carried by the first PDCCH indicates(indicate) a feedback mode adopted by the second HARQ feedback.

In one embodiment, the statement that "the first PDCCH is used to indicate a feedback mode adopted by the second HARQ feedback" in the claims includes the following meaning: a Downlink assignment index (DAI) comprised in a DCI Format carried by the first PDCCH is used for indicating a feedback mode adopted by the second HARQ feedback.

In one embodiment, the statement that "the first PDCCH is used to indicate a feedback mode adopted by the second HARQ feedback" in the claims includes the following meaning: one or more fields comprised in a DCI Format carried by the first PDCCH being interpreted in a new way is used for indicating a feedback mode adopted by the second HARQ feedback.

In one embodiment, the statement that "the first PDCCH is used to indicate a feedback mode adopted by the second HARQ feedback" in the claims includes the following meaning: the first PDCCH is used for indicating whether a feedback mode adopted by the second HARQ feedback is the first candidate feedback mode or the second candidate feedback mode.

In one embodiment, the statement that "the first PDCCH is used to indicate a feedback mode adopted by the second HARQ feedback" in the claims includes the following meaning: the first PDCCH is used for indicating whether the second HARQ feedback is a NACK-only HARQ feedback.

In one embodiment, the statement that "the first PDCCH is used to indicate a feedback mode adopted by the second HARQ feedback" in the claims includes the following meaning: the first PDCCH is used for indicating whether the second HARQ feedback is an ACK/NACK-including HARQ feedback or a NACK-only HARQ feedback.

In one embodiment, the statement that "the first PDCCH is used to indicate a feedback mode adopted by the second HARQ feedback" in the claims includes the following meaning: the first PDCCH is used for indicating whether a NACK-only HARQ feedback is on/off or enabled/disabled.

In one embodiment, the first candidate feedback mode is an ACK/NACK-adopting HARQ.

In one embodiment, the second candidate feedback mode is a NACK-only-adopting HARQ.

In one embodiment, a HARQ feedback which adopts the first candidate feedback mode can be an ACK or a NACK.

In one embodiment, for a HARQ feedback which adopts the first candidate feedback mode, when decoding is successful, feedback an ACK, when decoding is failed, feedback a NACK.

In one embodiment, a HARQ feedback which adopts the second candidate feedback mode indicates an ACK or a NACK according to whether a HARQ feedback is sent.

In one embodiment, for a HARQ feedback which adopts the second candidate feedback mode, only when the first node fails decoding will the first node transmit the HARQ feedback which adopts the second candidate feedback mode.

In one embodiment, a HARQ feedback which adopts the second candidate feedback mode being transmitted is used for indicating a NACK, while a HARQ feedback which adopts the second candidate feedback mode not being transmitted is used for indicating an ACK.

Embodiment 13

Figure 13:
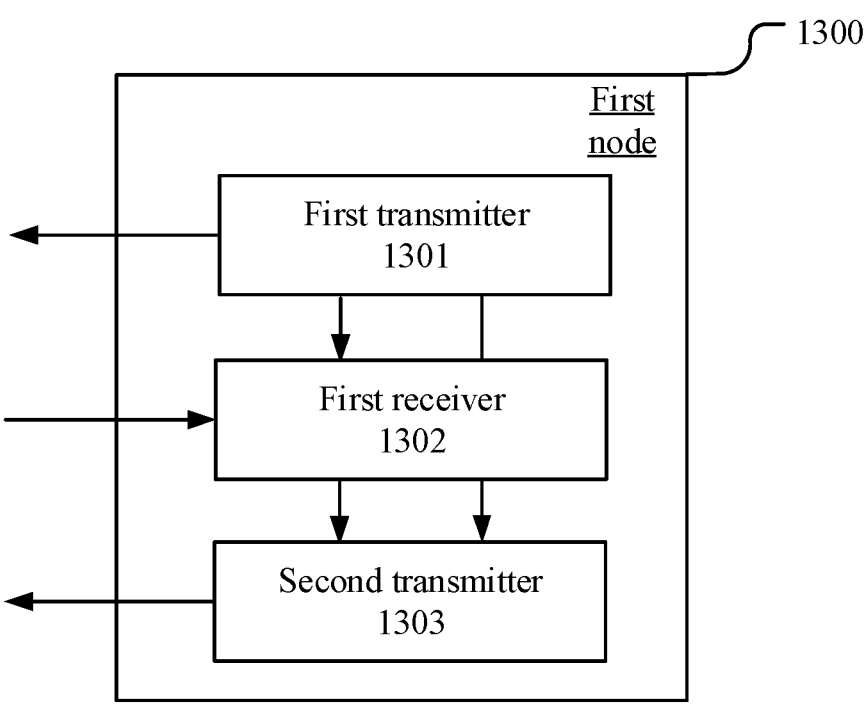
FIG. 13 illustrates a structure block diagram of a processing device in a first node according to one embodiment of the present disclosure.

Embodiment 13 illustrates a structure block diagram of a processing device in a first node in an example, as shown in FIG. 13. In FIG. 13, a first node's processing node 1300 comprises a first transmitter 1301, a first receiver 1302 and a second transmitter 1303. The first transmitter 1301 comprises the transmitter/receiver 456 (comprising the antenna 460) and the transmitting processor 455 in FIG. 4 of the present disclosure; The first receiver 1302 comprises the transmitter/receiver 456 (comprising the antenna 460), the receiving processor 452 and the controller/processor 490 in FIG. 4 of the present disclosure; The second transmitter 1303 comprises the transmitter/receiver 456 (comprising the antenna 460) and the transmitting processor 455 in FIG. 4 of the present disclosure.

In Embodiment 13, the first transmitter transmits a first HARQ feedback, the first HARQ feedback being used to indicate either an ACK or a NACK; the first receiver 1302 receives a first PDCCH, the first PDCCH being used to determine scheduling information for a first PDSCH; and the second transmitter 1303 determines whether a target condition is fulfilled, and, when the target condition is fulfilled, transmitting a second HARQ feedback, the second HARQ feedback being only used to indicate a NACK; herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine the target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback.

In one embodiment, the first HARQ feedback is used to determine whether the first PDSCH is to be received, the target condition comprising that: the first PDSCH is received and decoding on the first bit block is failed; or the first receiver 1302 receives the first PDSCH, the target condition comprising that: the first HARQ feedback indicates a NACK and the decoding on the first bit block is failed.

In one embodiment, the first receiver 1302 receives a first information block and a second PDCCH; where the first information block is used to determine G1 candidate resource blocks, with a first resource block being one of the G1 candidate resource blocks, G1 being a positive integer greater than 1, the second PDCCH is used to determine the first resource block out of the G1 candidate resource blocks; the first HARQ feedback occupies a target resource block, the first resource block being used to determine the target resource block.

In one embodiment, the first HARQ feedback is used to determine a first value, the first value being equal to one of W1 candidate values, W1 being a positive integer greater than 1. the first value is used to determine a cyclic shift value of sequence(s) comprised in a first sequence set, the first sequence set comprises a positive integer number of sequence(s), and any sequence comprised in the first sequence set is generated by a first basic sequence through cyclic shift; a second value is used for the second HARQ feedback, and the second value is used to determine a cyclic shift value of sequence(s) comprised in a second sequence set, the second sequence set comprises a positive integer number of sequence(s), and any sequence comprised in the second sequence set is generated by the first basic sequence through cyclic shift; any of the W1 candidate values is a non-negative integer, and the second value is equal to one of the W1 candidate values.

In one embodiment, a target PUCCH is used for carrying the second HARQ feedback, the target PUCCH occupying X1 multicarrier symbols in time domain, where X1 is a positive integer greater than 1; a target multicarrier symbol is one of the X1 multicarrier symbols, a target RE set comprises multiple REs occupied by the target PUCCH, any RE comprised in the target RE set occupying the target multicarrier symbol in time domain; a target sequence is used for generating a complex-valued symbol mapped onto the target RE set, a time-domain position of the target multicarrier symbol is used to determine the target sequence.

In one embodiment, X2 modulation symbols are used for generating the target PUCCH, X2 being a positive integer greater than 1; any two modulation symbols among the X2 modulation symbols employ a same modulation mode, and there are two modulation symbols among the X2 modulation symbols having different phases; a target RE is an RE occupied by the target PUCCH, a target modulation symbol is one of the X2 modulation symbols, and the target modulation symbol is used for generating a complex-value symbol mapped onto the target RE; the target RE occupies the target multicarrier symbol in time domain, a time-domain position of the target multicarrier symbol is used to determine the target modulation symbol.

In one embodiment, the first PDCCH is used to determine that the first PDSCH carries a retransmission of the first bit block; the first PDCCH is used to indicate a feedback mode adopted by the second HARQ feedback, which is either a first candidate feedback mode or a second candidate feedback mode; the HARQ feedback which adopts the first candidate feedback mode comprises one of an ACK or a NACK, while the HARQ feedback which adopts the second candidate feedback mode comprises only a NACK.

Embodiment 14

Figure 14:
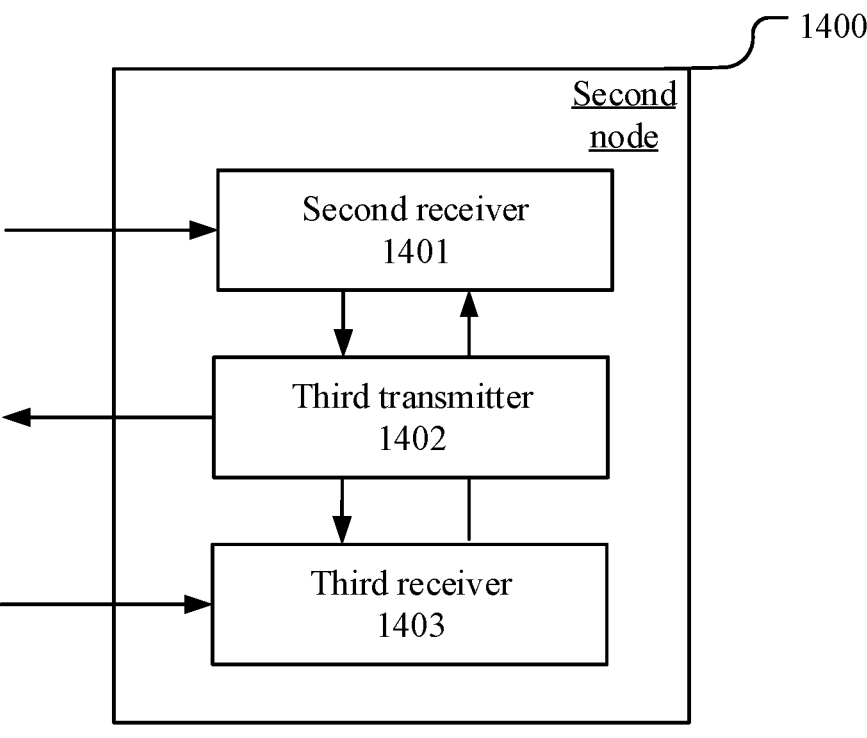
FIG. 14 illustrates a structure block diagram a processing device in a second node according to one embodiment of the present disclosure.

Embodiment 14 illustrates a structure block diagram of a processing device in a second node in an example, as shown in FIG. 14. In FIG. 14, a second node's processing device 1400 comprises a second receiver 1401, a third transmitter 1402 and a third receiver 1403. The second receiver 1401 comprises the transmitter/receiver 416 (comprising the antenna 460) and the receiving processor 412 in FIG. 4 of the present disclosure; the third transmitter 1402 comprises the transmitter/receiver 416 (comprising the antenna 460), the transmitting processor 415 and the controller/processor 440 in FIG. 4 of the present disclosure; the third receiver 1403 comprises the transmitter/receiver 416 (comprising the antenna 460) and the receiving processor 412 in FIG. 4 of the present disclosure.

In Embodiment 14, the second receiver 1401 receives a first HARQ feedback, the first HARQ feedback being used to indicate either an ACK or a NACK; the third transmitter 1402 transmits a first PDCCH, the first PDCCH being used to determine scheduling information for a first PDSCH; and the third receiver 1403 monitors a second HARQ feedback, the second HARQ feedback being only used to indicate a NACK; herein, the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine a target condition, when the target condition is fulfilled the second HARQ feedback is transmitted; the second HARQ feedback is used for the first bit block, and the second HARQ feedback is no earlier than the first PDSCH, the first PDCCH is used to indicate at least one of a time-domain resource occupied by the second HARQ feedback, a frequency-domain resource occupied by the second HARQ feedback or a code-domain resource occupied by the second HARQ feedback.

In one embodiment, the third transmitter 1402 transmits the first PDSCH; herein, the first HARQ feedback is used to determine whether the first PDSCH is to be received, the target condition comprising that: the first PDSCH is received and decoding on the first bit block is failed; or the transmitter for the first HARQ feedback receives the first PDSCH, the target condition comprising that: the first HARQ feedback indicates a NACK and the decoding on the first bit block is failed.

In one embodiment, the third transmitter 1402 transmits a first information block and a second PDCCH; where the first information block is used to determine G1 candidate resource blocks, with a first resource block being one of the G1 candidate resource blocks, G1 being a positive integer greater than 1, the second PDCCH is used to indicate the first resource block out of the G1 candidate resource blocks; the first HARQ feedback occupies a target resource block, the first resource block being used to determine the target resource block.

In one embodiment, the first HARQ feedback is used to determine a first value, the first value being equal to one of W1 candidate values, W1 being a positive integer greater than 1. the first value is used to determine a cyclic shift value of sequence(s) comprised in a first sequence set, the first sequence set comprises a positive integer number of sequence(s), and any sequence comprised in the first sequence set is generated by a first basic sequence through cyclic shift; a second value is used for the second HARQ feedback, and the second value is used to determine a cyclic shift value of sequence(s) comprised in a second sequence set, the second sequence set comprises a positive integer number of sequence(s), and any sequence comprised in the second sequence set is generated by the first basic sequence through cyclic shift; any of the W1 candidate values is a non-negative integer, and the second value is equal to one of the W1 candidate values.

In one embodiment, a target PUCCH is used for carrying the second HARQ feedback, the target PUCCH occupying X1 multicarrier symbols in time domain, where X1 is a positive integer greater than 1; a target multicarrier symbol is one of the X1 multicarrier symbols, a target RE set comprises multiple REs occupied by the target PUCCH, any RE comprised in the target RE set occupying the target multicarrier symbol in time domain; a target sequence is used for generating a complex-valued symbol mapped onto the target RE set, a time-domain position of the target multicarrier symbol is used to determine the target sequence.

In one embodiment, X2 modulation symbols are used for generating the target PUCCH, X2 being a positive integer greater than 1; any two modulation symbols among the X2 modulation symbols employ a same modulation mode, and there are two modulation symbols among the X2 modulation symbols having different phases; a target RE is an RE occupied by the target PUCCH, a target modulation symbol is one of the X2 modulation symbols, and the target modulation symbol is used for generating a complex-value symbol mapped onto the target RE; the target RE occupies the target multicarrier symbol in time domain, a time-domain position of the target multicarrier symbol is used to determine the target modulation symbol.

In one embodiment, the first PDCCH is used to indicate that the first PDSCH carries a retransmission of the first bit block; the first PDCCH is used to indicate a feedback mode adopted by the second HARQ feedback, which is either a first candidate feedback mode or a second candidate feedback mode; the HARQ feedback which adopts the first candidate feedback mode comprises one of an ACK or a NACK, while the HARQ feedback which adopts the second candidate feedback mode comprises only a NACK.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, test equipment or test instrument, and other radio communication equipment, etc. The base station in the present disclosure includes but is not limited to macro-cellular base stations, micro-cellular base stations, home base stations, relay base station, eNB, gNB, Transmitter Receiver Point (TRP), relay satellite, satellite base station, airborne base station, test apparatus, test equipment or test instrument, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first transmitter, transmitting a first HARQ (Hybrid Automatic Repeat Request) feedback, the first HARQ feedback being used to indicate either an ACK (Acknowledgement) or a NACK (Non-Acknowledgement);
a first receiver, receiving a first PDCCH (Physical Downlink Control Channel), the first PDCCH being used to determine scheduling information for a first PDSCH (Physical Downlink Shared Channel); and
a second transmitter, determining whether a target condition is fulfilled, and, when the target condition is fulfilled, transmitting a second HARQ feedback, the second HARQ feedback being only used to indicate a NACK;
wherein the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine the target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback.

2. The first node according to claim 1, wherein the first HARQ feedback is used to determine whether the first PDSCH is to be received, the target condition comprising that: the first PDSCH is received and the first bit block is not correctly decoded; or the first receiver receives the first PDSCH, the target condition comprising that: the first HARQ feedback indicates a NACK and the first bit block is not correctly decoded.

3. The first node according to claim 1, wherein the first receiver receives a first information block and a second PDCCH; where the first information block is used to determine G1 candidate resource blocks, with a first resource block being one of the G1 candidate resource blocks, G1 being a positive integer greater than 1, the second PDCCH is used to determine the first resource block out of the G1 candidate resource blocks; the first HARQ feedback occupies a target resource block, the first resource block being used to determine the target resource block.

4. The first node according to claim 1, wherein the first HARQ feedback is used to determine a first value, the first value being equal to one of W1 candidate values, W1 being a positive integer greater than 1; the first value is used to determine a cyclic shift value of a sequence comprised in a first sequence set, the first sequence set comprises a positive integer number of sequence(s), and any sequence comprised in the first sequence set is generated by a first basic sequence through cyclic shift; a second value is used for the second HARQ feedback, and the second value is used to determine a cyclic shift value of a sequence comprised in a second sequence set, the second sequence set comprises a positive integer number of sequence(s), and any sequence comprised in the second sequence set is generated by the first basic sequence through cyclic shift; any of the W1 candidate values is a non-negative integer, and the second value is equal to one of the W1 candidate values.

5. The first node according to claim 1, wherein a target PUCCH (Physical Uplink Control Channel) is used for carrying the second HARQ feedback, the target PUCCH occupying X1 multicarrier symbols in time domain, where X1 is a positive integer greater than 1; a target multicarrier symbol is one of the X1 multicarrier symbols, a target RE (Resource Element) set comprises multiple REs occupied by the target PUCCH, any RE comprised in the target RE set occupying the target multicarrier symbol in time domain; a target sequence is used for generating complex-value symbols mapped onto the target RE set, a time-domain position of the target multicarrier symbol is used to determine the target sequence.

6. The first node according to claim 5, wherein X2 modulation symbols are used for generating the target PUCCH, X2 being a positive integer greater than 1; any two modulation symbols among the X2 modulation symbols employ a same modulation scheme, and there are two modulation symbols among the X2 modulation symbols having different phases; a target RE is an RE occupied by the target PUCCH, a target modulation symbol is one of the X2 modulation symbols, and the target modulation symbol is used for generating a complex-value symbol mapped onto the target RE; the target RE occupies the target multicarrier symbol in time domain, a time-domain position of the target multicarrier symbol is used to determine the target modulation symbol.

7. The first node according to claim 1, wherein the first PDCCH is a PDCCH used for multicast or broadcast, while the first PDSCH is multicast or broadcast, an RNTI (Radio Network Temporary Identifier) allocated to multicast or broadcast is used to initialize a generator of a scrambling sequence for the first PDSCH, and the second HARQ feedback is transmitted on a Physical Uplink Control Channel (PUCCH).

8. A second node for wireless communications, comprising:
a second receiver, receiving a first HARQ (Hybrid Automatic Repeat Request) feedback, the first HARQ feedback being used to indicate either an ACK (Acknowledgement) or a NACK (Non-Acknowledgement);
a third transmitter, transmitting a first PDCCH (Physical Downlink Control Channel), the first PDCCH being used to determine scheduling information for a first PDSCH (Physical Downlink Shared Channel); and
a third receiver, monitoring a second HARQ feedback, the second HARQ feedback being only used to indicate a NACK;
wherein the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine a target condition, when the target condition is fulfilled the second HARQ feedback is transmitted; the second HARQ feedback is used for the first bit block, and the second HARQ feedback is no earlier than the first PDSCH, the first PDCCH is used to indicate at least one of a time-domain resource occupied by the second HARQ feedback, a frequency-domain resource occupied by the second HARQ feedback or a code-domain resource occupied by the second HARQ feedback.

9. The second node according to claim 8, wherein the third transmitter transmits the first PDSCH; wherein the first HARQ feedback is used to determine whether the first PDSCH is to be received, the target condition comprising that: the first PDSCH is received and the first bit block is not correctly decoded; or the transmitter for the first HARQ feedback receives the first PDSCH, the target condition comprising that: the first HARQ feedback indicates a NACK and the first bit block is not correctly decoded.

10. The second node according to claim 8, wherein the third transmitter transmits a first information block and a second PDCCH; where the first information block is used to determine G1 candidate resource blocks, with a first resource block being one of the G1 candidate resource blocks, G1 being a positive integer greater than 1, the second PDCCH is used to indicate the first resource block out of the G1 candidate resource blocks; the first HARQ feedback occupies a target resource block, the first resource block being used to determine the target resource block.

11. The second node according to claim 8, wherein the first HARQ feedback is used to determine a first value, the first value being equal to one of W1 candidate values, W1 being a positive integer greater than 1; the first value is used to determine a cyclic shift value of a sequence comprised in a first sequence set, the first sequence set comprises a positive integer number of sequence(s), and any sequence comprised in the first sequence set is generated by a first basic sequence through cyclic shift; a second value is used for the second HARQ feedback, and the second value is used to determine a cyclic shift value of a sequence comprised in a second sequence set, the second sequence set comprises a positive integer number of sequence(s), and any sequence comprised in the second sequence set is generated by the first basic sequence through cyclic shift; any of the W1 candidate values is a non-negative integer, and the second value is equal to one of the W1 candidate values.

12. The second node according to claim 8, wherein a target PUCCH (Physical Uplink Control Channel) is used for carrying the second HARQ feedback, the target PUCCH occupying X1 multicarrier symbols in time domain, where X1 is a positive integer greater than 1; a target multicarrier symbol is one of the X1 multicarrier symbols, a target RE (Resource Element) set comprises multiple REs occupied by the target PUCCH, any RE comprised in the target RE set occupying the target multicarrier symbol in time domain; a target sequence is used for generating complex-value symbols mapped onto the target RE set, a time-domain position of the target multicarrier symbol is used to determine the target sequence.

13. The second node according to claim 12, wherein X2 modulation symbols are used for generating the target PUCCH, X2 being a positive integer greater than 1; any two modulation symbols among the X2 modulation symbols employ a same modulation scheme, and there are two modulation symbols among the X2 modulation symbols having different phases; a target RE is an RE occupied by the target PUCCH, a target modulation symbol is one of the X2 modulation symbols, and the target modulation symbol is used for generating a complex-value symbol mapped onto the target RE; the target RE occupies the target multicarrier symbol in time domain, a time-domain position of the target multicarrier symbol is used to determine the target modulation symbol.

14. A method in a first node for wireless communications, comprising:

transmitting a first HARQ (Hybrid Automatic Repeat Request) feedback, the first HARQ feedback being used to indicate either an ACK (Acknowledgement) or a NACK (Non-Acknowledgement);

receiving a first PDCCH (Physical Downlink Control Channel), the first PDCCH being used to determine scheduling information for a first PDSCH (Physical Downlink Shared Channel); and determining whether a target condition is fulfilled, and, when the target condition is fulfilled, transmitting a second HARQ feedback, the second HARQ feedback being only used to indicate a NACK;

wherein the first PDSCH is used for a retransmission of a first bit block, the first bit block comprising more than one bit; the first HARQ feedback is used for the first bit block, and the first HARQ feedback is earlier than the first PDSCH, the first HARQ feedback being used to determine the target condition; the second HARQ feedback is used for the first bit block, and the second HARQ feedback is later than the first PDSCH, the first PDCCH is used to determine at least one of a time-domain resource occupied by the second HARQ feedback, a frequency-domain resource occupied by the second HARQ feedback or a code-domain resource occupied by the second HARQ feedback.

15. The method in the first node according to claim 14, wherein the first HARQ feedback is used to determine whether the first PDSCH is to be received, the target condition comprising: the first PDSCH is received and the first bit block is not correctly decoded; or comprising:

receiving the first PDSCH, the target condition comprising that: the first HARQ feedback indicates a NACK and the first bit block is not correctly decoded.

16. The method in the first node according to claim 14, comprising:

receiving a first information block and a second PDCCH;

wherein the first information block is used to determine G1 candidate resource blocks, with a first resource block being one of the G1 candidate resource blocks, G1 being a positive integer greater than 1, the second PDCCH is used to determine the first resource block out of the G1 candidate resource blocks; the first HARQ feedback occupies a target resource block, the first resource block being used to determine the target resource block.

17. The method in the first node according to claim 14, wherein the first HARQ feedback is used to determine a first value, the first value being equal to one of W1 candidate values, W1 being a positive integer greater than 1; the first value is used to determine a cyclic shift value of a sequence comprised in a first sequence set, the first sequence set comprises a positive integer number of sequence(s), and any sequence comprised in the first sequence set is generated by a first basic sequence through cyclic shift; a second value is used for the second HARQ feedback, and the second value is used to determine a cyclic shift value of a sequence comprised in a second sequence set, the second sequence set comprises a positive integer number of sequence(s), and any sequence comprised in the second sequence set is generated by the first basic sequence through cyclic shift; any of the W1 candidate values is a non-negative integer, and the second value is equal to one of the W1 candidate values.

18. The method in the first node according to claim 14, wherein a target PUCCH (Physical Uplink Control Channel) is used for carrying the second HARQ feedback, the target PUCCH occupying X1 multicarrier symbols in time domain, where X1 is a positive integer greater than 1; a target multicarrier symbol is one of the X1 multicarrier symbols, a target RE (Resource Element) set comprises multiple REs occupied by the target PUCCH, any RE comprised in the target RE set occupying the target multicarrier symbol in time domain; a target sequence is used for generating complex-value symbols mapped onto the target RE set, a time-domain position of the target multicarrier symbol is used to determine the target sequence.

19. The method in the first node according to claim 18, wherein X2 modulation symbols are used for generating the target PUCCH, X2 being a positive integer greater than 1; any two modulation symbols among the X2 modulation symbols employ a same modulation scheme, and there are two modulation symbols among the X2 modulation symbols having different phases; a target RE is an RE occupied by the target PUCCH, a target modulation symbol is one of the X2 modulation symbols, and the target modulation symbol is used for generating a complex-value symbol mapped onto the target RE; the target RE occupies the target multicarrier symbol in time domain, a time-domain position of the target multicarrier symbol is used to determine the target modulation symbol.

20. The method in the first node according to claim 14, wherein the first PDCCH is a PDCCH used for multicast or broadcast, while the first PDSCH is multicast or broadcast, an RNTI (Radio Network Temporary Identifier) allocated to multicast or broadcast is used to initialize a generator of scrambling sequence for the first PDSCH, and the second HARQ feedback is transmitted on a Physical Uplink Control Channel (PUCCH).

\* \* \* \* \*